(12) United States Patent
Kageme et al.

(10) Patent No.: US 10,746,865 B2
(45) Date of Patent: Aug. 18, 2020

(54) RADAR SYSTEM

(71) Applicant: MITSUBISHI ELECTRIC CORPORATION, Tokyo (JP)

(72) Inventors: Satoshi Kageme, Tokyo (JP); Teruyuki Hara, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 212 days.

(21) Appl. No.: 16/074,362

(22) PCT Filed: Feb. 29, 2016

(86) PCT No.: PCT/JP2016/056045
§ 371 (c)(1),
(2) Date: Jul. 31, 2018

(87) PCT Pub. No.: WO2017/149596
PCT Pub. Date: Sep. 8, 2017

(65) Prior Publication Data
US 2019/0339374 A1 Nov. 7, 2019

(51) Int. Cl.
*G01S 13/44* (2006.01)
*G01S 7/295* (2006.01)
(Continued)

(52) U.S. Cl.
CPC .......... *G01S 13/449* (2013.01); *G01S 7/295* (2013.01); *G01S 13/003* (2013.01); *G01S 13/50* (2013.01);
(Continued)

(58) Field of Classification Search
CPC .... G01S 13/931; G01S 13/449; G01S 13/003; G01S 7/295; G01S 7/415;
(Continued)

(56) References Cited

U.S. PATENT DOCUMENTS 5,374,931 A * 12/1994 Wiener ................. G01S 13/581
342/115
9,791,551 B1 * 10/2017 Eshraghi ............... G01S 13/347
(Continued)

OTHER PUBLICATIONS

Dai et al., "Low-sidelobe HRR profiling based on the FDLFM-MIMO radar", APSAR 2007. 1st Asian and Pacific Conference, pp. 132-135.
(Continued)

*Primary Examiner* — Peter M Bythrow
(74) *Attorney, Agent, or Firm* — Birch. Stewart, Kolasch & Birch, LLP

(57) ABSTRACT

A frequency domain transforming unit (231-1) performs a transform into a frequency domain in such a way that a Doppler velocity bin is the same for each of different transmission frequencies. A correlation unit (232-1) generates signals based on a velocity and a range after correlation, the signals being separate for each of the transmission frequencies. An integrating unit (233-1) generates band-synthesized signals based on a velocity and a range after correlation. A target candidate detecting unit (241) performs detection of a target candidate on output signals of the integrating unit (233-1) on the basis of signal strength. A target's relative-velocity/relative-range/arrival-angle calculating unit (242) calculates a relative velocity, a relative range, and an arrival angle of the target candidate.

10 Claims, 27 Drawing Sheets

(51) Int. Cl.
  *G01S 13/00* (2006.01)
  *G01S 13/50* (2006.01)
  *G01S 13/522* (2006.01)
  *G01S 13/87* (2006.01)
  *G01S 13/931* (2020.01)

(52) U.S. Cl.
  CPC ............. *G01S 13/522* (2013.01); *G01S 13/87* (2013.01); *G01S 13/931* (2013.01)

(58) Field of Classification Search
  CPC ............. G01S 2007/2883; G01S 13/50; G01S 13/522; G01S 13/536; G01S 13/581; G01S 13/87; G01S 13/872
  See application file for complete search history.

(56) References Cited

U.S. PATENT DOCUMENTS

| | | | | |
|---|---|---|---|---|
| 2005/0073455 | A1* | 4/2005 | Chow | G01S 13/9017 342/25 F |
| 2005/0156780 | A1* | 7/2005 | Bonthron | G01S 13/931 342/107 |
| 2014/0091964 | A1* | 4/2014 | Comic | G01S 13/02 342/189 |
| 2016/0103216 | A1* | 4/2016 | Whelan | G01S 7/414 342/25 A |
| 2016/0285172 | A1* | 9/2016 | Kishigami | H01Q 21/08 |
| 2016/0363648 | A1* | 12/2016 | Mindell | G01S 13/74 |
| 2016/0363663 | A1* | 12/2016 | Mindell | G01S 5/021 |
| 2017/0276769 | A1* | 9/2017 | Kishigami | G01S 13/26 |
| 2017/0299711 | A1* | 10/2017 | Kishigami | G01S 13/581 |
| 2018/0074181 | A1* | 3/2018 | Kishigami | G01S 13/426 |
| 2018/0088221 | A1* | 3/2018 | Yomo | G01S 13/003 |
| 2018/0088224 | A1* | 3/2018 | Kishigami | G01S 13/42 |
| 2019/0056506 | A1* | 2/2019 | Bialer | G01S 3/043 |
| 2019/0107599 | A1* | 4/2019 | Pheiffer | G01S 7/021 |
| 2019/0250249 | A1* | 8/2019 | Raphaeli | G01S 13/581 |
| 2019/0391246 | A1* | 12/2019 | Dammert | G01S 13/931 |
| 2020/0011968 | A1* | 1/2020 | Hammes | G01S 13/003 |

OTHER PUBLICATIONS

Skolnik, "Radar Handbook, Third Edition", MacGraw-Hill companies, 2008, total of 4 pages.

* cited by examiner

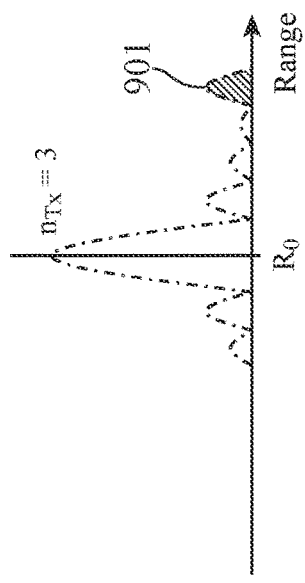
FIG. 9A
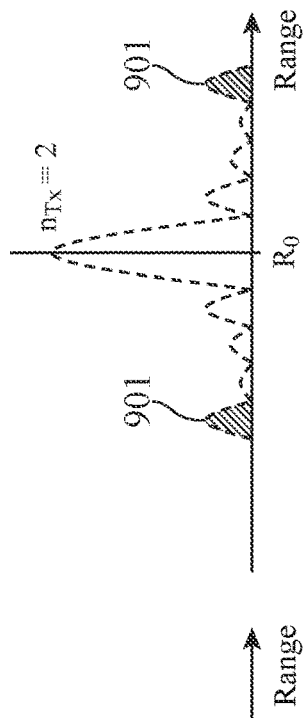
FIG. 9B
FIG. 9C
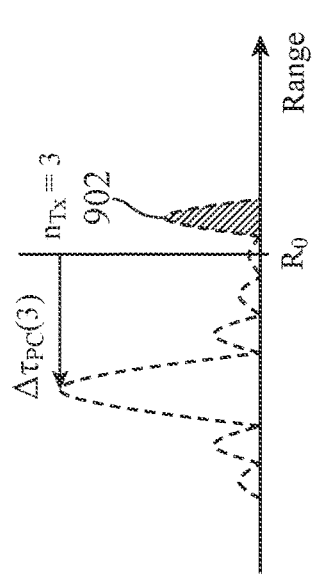
FIG. 9D
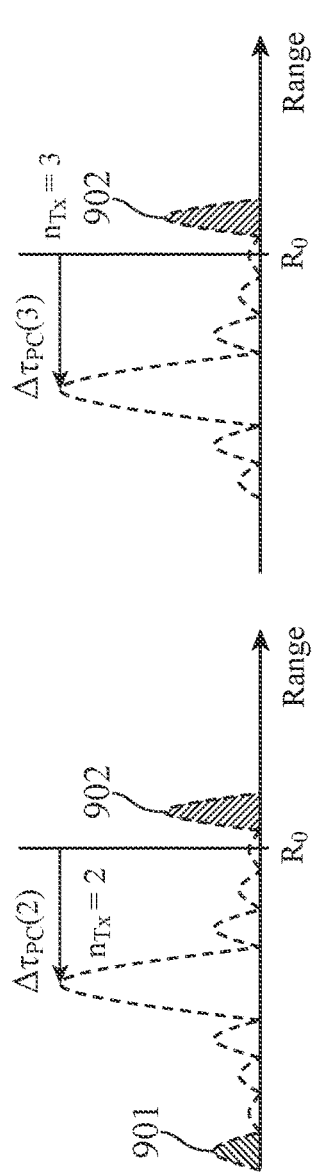
FIG. 9E
FIG. 9F

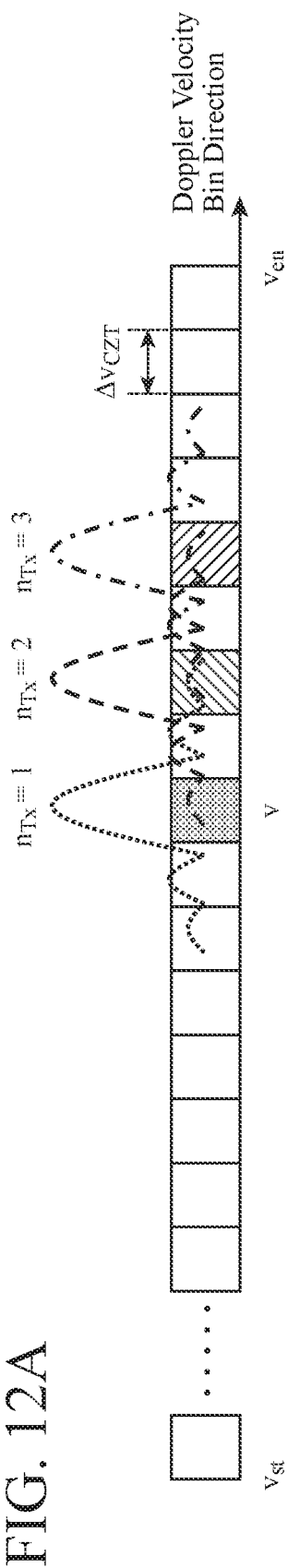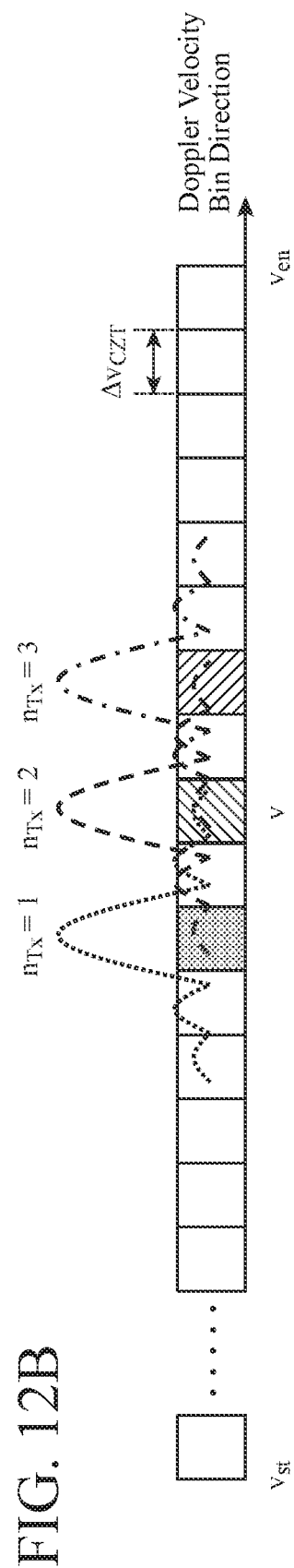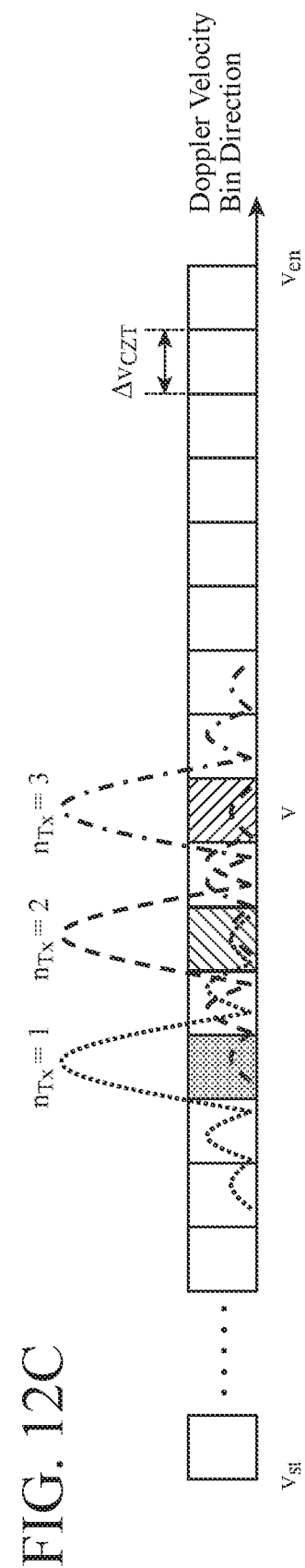

RADAR SYSTEM

TECHNICAL FIELD

The present disclosure relates to a radar system including multiple transmission radars for transmitting signals whose transmission frequencies are changed at a predetermined spacing, and a reception radar for receiving signals reflected by a target, to perform signal processing on the received signals, thereby performing target detection, range measurement, velocity measurement, angle measurement, etc.

BACKGROUND ART

In a conventional radar system, discrete transmission radars transmit transmission signals of different center frequencies for which intrapulse frequency modulation is performed upwardly, as disclosed in, for example, Nonpatent Literature 1. A reception radar receives the transmitted signals that are reflected by a target as reception signals. Then, under the assumption that no influences are caused by the Doppler frequency by the target, the reception signals having different center frequencies, i.e., reception signals in different bands are separated, the reception signals are multiplied by a window function to suppress sidelobes occurring due to the cross correlation between the reception signals of different bands, and integration (synthesis) is performed.

According to such a conventional radar system described above, under the assumption that there is no influence of the Doppler frequency of a target, the reception signals having the different center frequencies can be integrated coherently, high range resolution can be provided, and sidelobes occurring due to the cross correlation can be suppressed by multiplying the reception signals by window functions.

CITATION LIST

Non Patent Literature

Non Patent Literature 1: XiZeng Dai, Jia Xu, Chunmao Ye, Ying-Ning Peng, "Low-sidelobe HRR profiling based on the FDLFM-MIMO radar," APSAR 2007. 1st Asian and Pacific Conference

SUMMARY OF INVENTION

Technical Problem

However, there is a problem with the conventional radar system in that when there is an influence of the Doppler frequency of a target sidelobes occurring due to the cross correlation between the reception signals in the different bands increase. Another problem is that when there is an influence of the Doppler frequency of the target, because the locations of signals after pulse compression, i.e., the ranges at which the reception signals are integrated deviate from the relative range of the target, as described in, for example, literature: Merrill I. Skolnik, "Radar Handbook, Third Edition", MacGraw-Hill companies, 2008, the range measurement cannot be performed correctly. A further problem is that because the transmission frequency differs for each of the transmission radars, the phases of signals after pulse compression differ in accordance with the transmission frequencies, the reception signals cannot be integrated coherently, and the detection performance degrades.

One or more embodiments of the present disclosure are made in order to solve the above-mentioned problems, and an object of one or more embodiments is to provide a radar system that can improve its target detection performance even in a case in which there is an influence of the Doppler frequency of a target.

Solution to Problem

According to the present disclosure, there is provided a radar system including: multiple transmission radars for emitting transmission signals with different frequencies, each frequency being generated using a pulse signal and an intrapulse modulation signal used for performing frequency modulation on the pulse signal; a receiving unit for converting received signals of the transmission signals that return from a target on reflection, into a reception video signal; a frequency domain transforming unit for transforming the reception video signal into signals based on a velocity and a range in such a way that Doppler frequencies of the target belongs to a same velocity bin number regardless of a change in the frequencies of the transmission signals; a correlation unit for performing correlation process on output signals from the frequency domain transforming unit by using reference signals associated with both a transmission frequency of the multiple transmission radars and a velocity corresponding to a velocity bin number, to generate signals based on a velocity and a range after correlation, the signals being separate for each of the transmission frequencies of the multiple transmission radars; an integrating unit for integrating output signals from the correlation unit using target arrival angle candidates, to generate band-synthesized signals based on a velocity and a range after correlation; a target candidate detecting unit for performing detection of a target candidate on output signals from the integrating unit on a basis of signal strength; and a target's relative-velocity/relative-range/arrival-angle calculating unit for calculating a relative velocity, a relative range, and an arrival angle of the target candidate.

Advantageous Effects of Invention

In a radar system according to the present disclosure, the frequency domain transforming unit performs the transform into the frequency domain in such a way that the Doppler velocity bin is the same for each of the different transmission frequencies, and the correlation unit generates signals based on a velocity and a range after correlation, the signals being separate for each of the transmission frequencies. The integrating unit generates band-synthesized signals based on a velocity and a range after correlation, and the target candidate detecting unit performs detection of a target candidate on output signals from the integrating unit on the basis of signal strength. The target's relative-velocity/relative-range/arrival angle calculating unit calculates a relative velocity, a relative range, and an arrival angle of the target candidate. As a result, the target detection performance can be improved even in a case in which there is an influence of the Doppler frequency of the target.

BRIEF DESCRIPTION OF DRAWINGS

FIGS. 9A, 9B, 9C, 9D, 9E, and 9F are explanatory illustrations showing an influence of a Doppler frequency when pulse compression is performed on received signals corresponding to different transmission frequencies;

FIGS. 12A, 12B, and 12C are explanatory illustrations showing results of the transform into the frequency domain which is performed on the reception video signals corresponding to the transmission frequencies of the transmission radars by using a CZT;

DESCRIPTION OF EMBODIMENTS

Hereafter, in order to explain this disclosure in greater detail, embodiments of the present disclosure will be described with reference to the accompanying drawings.

Embodiment 1

Figure 1:
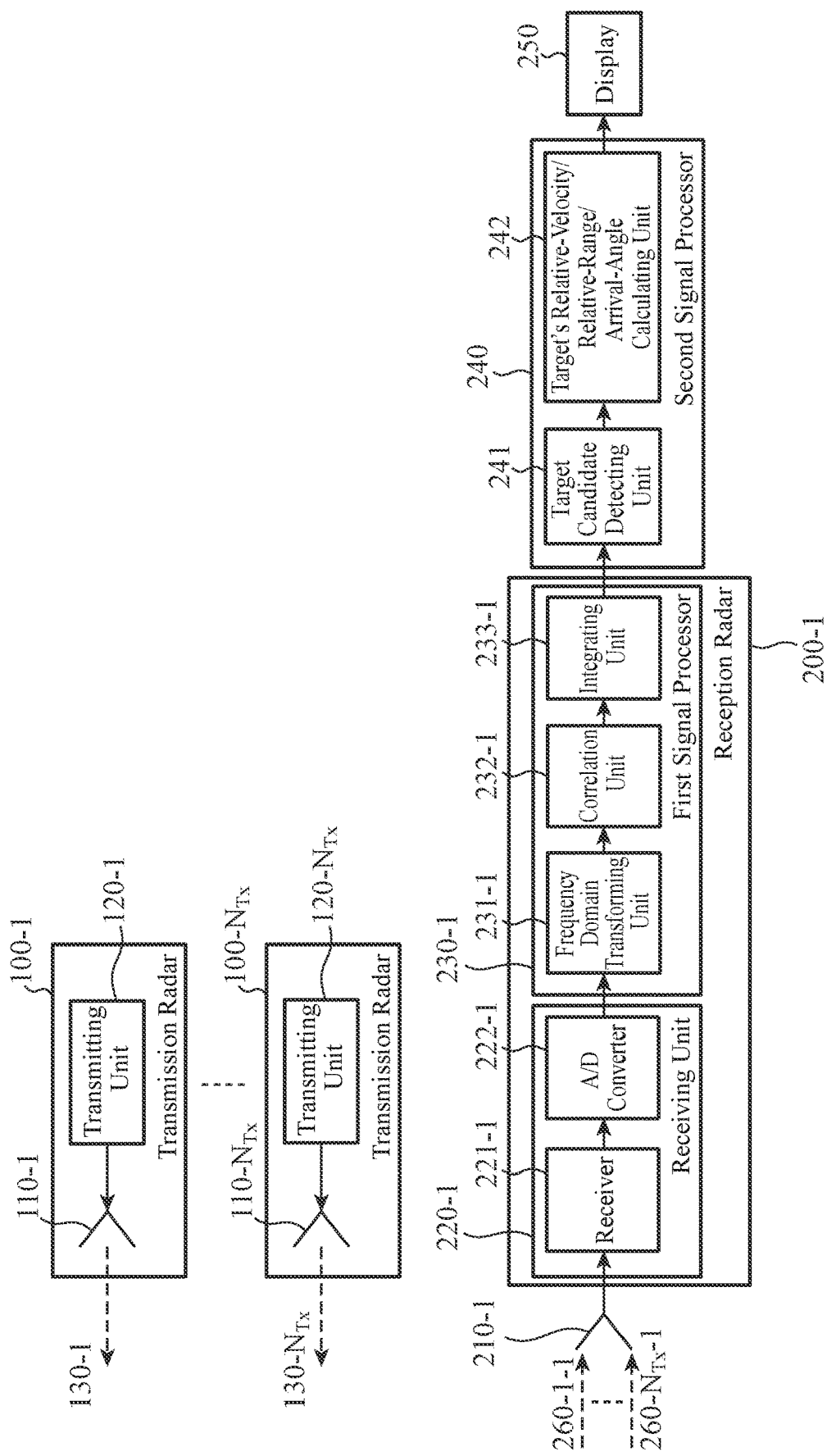
FIG. 1 is a block diagram showing a radar system according to Embodiment 1 of the present disclosure.

FIG. 1 is a block diagram of a radar system according to Embodiment 1.

Figure 2:
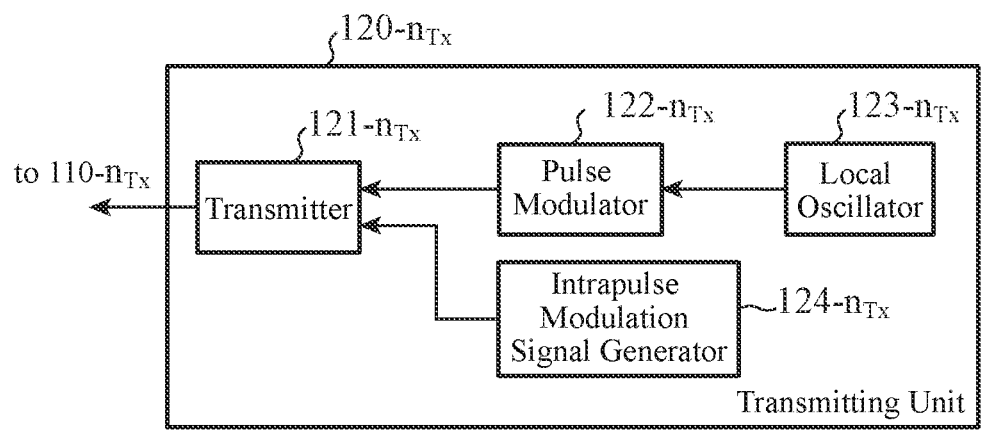
FIG. 2 is a block diagram of each transmitting unit of the radar system according to Embodiment 1 of the present disclosure.

The radar system according to this embodiment includes multiple transmission radars 100-$n_{Tx}$ ($n_{Tx}$ is transmission radar number; $n_{Tx}$=1, 2, . . . , $N_{Tx}$ in a case in which the number of transmission radars is $N_{Tx}$), a reception radar 200-1 ($n_{Rx}$ is reception radar number; $n_{Rx}$=1, 2, . . . , $N_{Rx}$ in a case in which the number of reception radars is $N_{Rx}$; a configuration in the case of $N_{Rx}$=1 will be explained in Embodiment 1), a second signal processor 240, and a display 250, as shown in the figure. Further, each transmission radar 100-$n_{Tx}$ includes an aerial 110-$n_{Tx}$ and a transmitting unit 120-$n_{Tx}$. Each transmitting unit 120-$n_{Tx}$ includes a transmitter 121-$n_{Tx}$, a pulse modulator 122-$n_{Tx}$, a local oscillator 123-$n_{Tx}$, and an intrapulse modulation signal generator 124-$n_{Tx}$, as shown in FIG. 2.

The reception radar 200-1 includes an aerial 210-1, a receiving unit 220-1, and a first signal processor 230-1. The receiving unit 220-1 includes a receiver 221-1 and an A/D converter 222-1. The first signal processor 230-1 includes a frequency domain transforming unit 231-1, a correlation unit 232-1, and an integrating unit 233-1. The second signal processor 240 includes a target candidate detecting unit 241, and a target's relative-velocity/relative-range/arrival-angle calculating unit 242.

Transmission radars 100-$n_{Tx}$ emit transmission signals with discrete frequencies generated from both a pulse signal and an intrapulse modulation signal for use of frequency-modulating the pulse signal. Each aerial 110-$n_{Tx}$ is an antenna that emits, as a transmission RF signal 130-$n_{Tx}$, a signal sent out from the transmitting unit 120-$n_{Tx}$. The transmitter 121-$n_{Tx}$ in each transmitting unit 120-$n_{Tx}$ is a processing unit that generates a transmission signal on the basis of both a pulse signal from the pulse modulator 122-$n_{Tx}$ and an intrapulse modulation signal from the intrapulse modulation signal generator 124-*nm*. Each pulse modulator 122-$n_{Tx}$ is a processing unit that generates a pulse signal by performing pulse modulation on a local oscillation signal from the local oscillator 123-$n_{Tx}$ on the basis of a preset period and pulse width. Each local oscillator 123-$n_{Tx}$ is a processing unit that generates a local oscillation signal. Each intrapulse modulation signal generator 124-$n_{Tx}$ is a processing unit that generates an intrapulse modulation signal used for performing frequency modulation on a pulse signal.

The reception radar 200-1 is a processing unit that receives the transmitted signal that is emitted by each transmission radar 100-$n_{Tx}$ and returned from a target on reflection. The aerial 210-1 of the reception radar 200-1 is an antenna for receiving reception RF signals 260-1-1 to 260-$N_{Tx}$-1. The receiver 221-1 in the receiving unit 220-1 is a processing unit that converts the received signals received by the aerial 210-1 into a reception video signal, and the A/D converter 222-1 is a processing unit that A/D converts the reception video signal outputted from the receiver 221-1. The frequency domain transforming unit 231-1 in the first signal processor 230-1 is a processing unit that transforms the reception video signal from the receiving unit 220-1 into a signal based on a velocity and a range in such a way that the Doppler frequency of a target belongs to the same velocity bin number regardless of a change in the frequency of the transmitted signal. The correlation unit 232-1 is a processing unit that performs a correlation process on the output signals of the frequency domain transforming unit 231-1 by using a reference signal corresponding to both the transmission frequency of each transmission radar 100-$n_{Tx}$ and a velocity corresponding to a velocity bin number, to generate signals based on a velocity and a range after correlation, the signals being separate for each of the transmission frequencies of the transmission radars 100-$n_{Tx}$. The integrating unit 233-1 is a processing unit that integrates the output signals of the correlation unit 232-1 using target arrival angle candidates, to generate band-synthesized signals based on a velocity and a range after correlation.

The target candidate detecting unit 241 in the second signal processor 240 is a processing unit that performs detection of a target candidate on the output signal of the integrating unit 233-1 on the basis of a signal strength. The target's relative-velocity/relative-range/arrival-angle calculating unit 242 is a processing unit that calculates a relative velocity, a relative range, and an arrival angle of a target candidate. Further, the display 250 is a display device for displaying a signal processing result.

Figure 3:
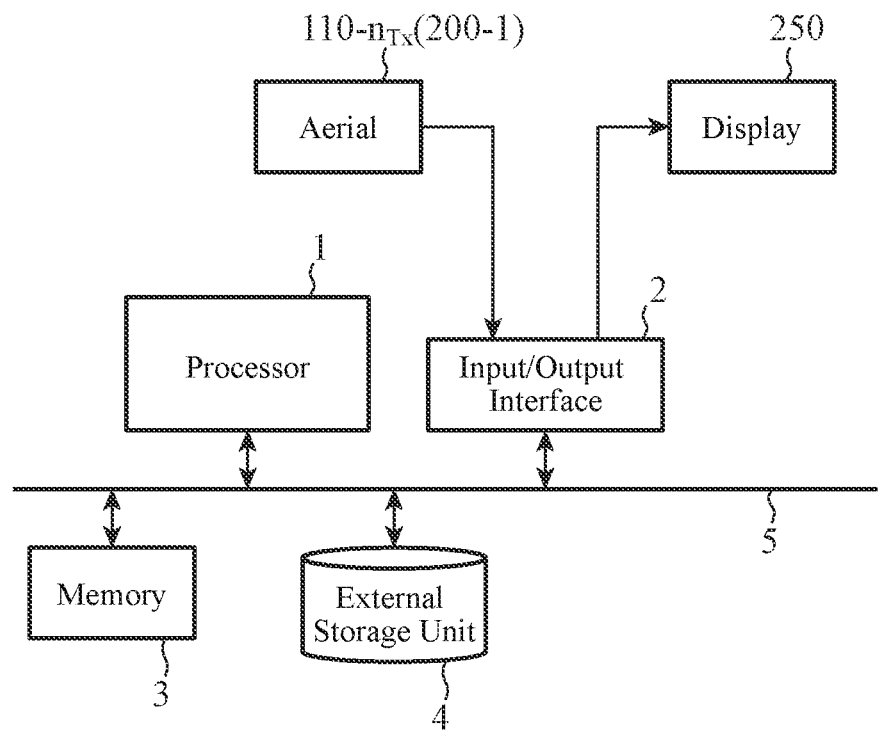
FIG. 3 is a block diagram showing an example of the hardware configuration of the radar system according to Embodiment 1 of present disclosure.

Next, an example of a hardware configuration for implementing the radar system configured as above will be explained using FIG. 3.

The radar system includes a processor 1, an input/output interface 2, a memory 3, an external storage unit 4, and a signal path 5. The processor 1 is the one for implementing the functions of the transmission radars 100-$n_{Tx}$, the reception radar 200-1, and the second signal processor 240 in the radar system. The input/output interface 2 is an interface for the transmission signal from the aerial 110-$n_{Tx}$ in each transmission radar 100-$n_{Tx}$ and the received signal from the aerial 210-1 in the reception radar 200-1, and for the output signal to the display 250. The memory 3 is a storage unit including a program memory for storing various programs for implementing the radar system according to this embodiment, and a ROM, a RAM, etc. which are used as a work memory which is used when the processor 1 performs data processing, a memory into which signal data are loaded, etc. The external storage unit 4 is used to store various data, such as various setting data for the processor 1 and signal data. As the external storage unit 4, for example, a volatile memory such as an SDRAM, an HDD, or an SSD can be used. Programs including an operating system (OS), and various data, such as various setting data and signal data, can be stored. Data stored in the memory 3 can also be stored in this external storage unit 4. The signal path 5 is a bus for connecting among the processor 1, the input/output interface 2, the memory 3, and the external storage unit 4.

Further, the number of processor 1 and memory 3 may be two or more, and the two or more processors 1 and memories 3 can be configured so as to perform signal processing in cooperation with each other.

In addition, at least one of the transmission radars 100-$n_{Tx}$, the reception radar 200-1, and the second signal processor 240 can be configured by hardware for exclusive use.

Next, the operation of the radar system according to Embodiment 1 will be explained.

Figure 4:
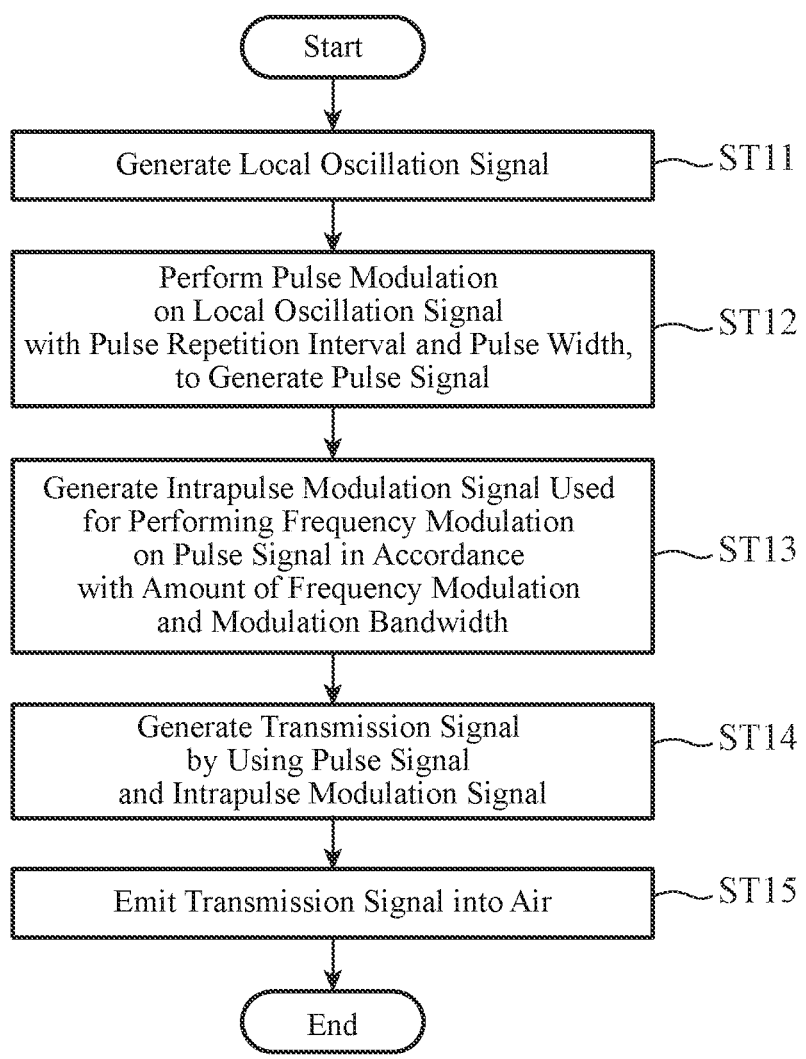
FIG. 4 is a flowchart showing an example of a transmitting operation of the radar system according to Embodiment 1 of the present disclosure.

First, the transmitting operation of each transmission radar 100-$n_{Tx}$ will be explained by reference to FIG. 4. Here, in the transmission radars 100-$n_{Tx}$, the aerials 110-$n_{Tx}$ have only to be distributedly arranged, or antenna elements can be distributedly arranged. More specifically, the transmission radars can be implemented by an multiple-input and multiple-output (MIMO) radar or digital beamforming (DBF).

In the transmitting operation of each transmission radar 100-$n_{Tx}$, the local oscillator 123-$n_{Tx}$ generates a local oscillation signal $L_0(t)$, as shown in Equation (1), and outputs the local oscillation signal to the pulse modulator 122-$n_{Tx}$ (step ST11).

$$L_0(t) = A_L \exp(j(2\pi f_0 t + \phi_0))$$

$$(0 \le t < T_{obs}) \quad (1)$$

$A_L$ denotes the amplitude of the local oscillation signal, $\phi_0$ denotes the initial phase of the local oscillation signal, $f_0$ denotes the center transmission frequency, and $T_{obs}$ denotes an observation time period.

Then, the pulse modulator 122-$n_{Tx}$ performs pulse modulation on the local oscillation signal $L_0(t)$ from the local oscillator 123-$n_{Tx}$ on the basis of information showing a preset pulse repetition interval $T_{pri}$ and a preset pulse width $T_0$ in accordance with Equation (2), to generate a pulse signal $L_{pls}(h, t)$, and outputs this pulse signal to the transmitter 121-$n_{Tx}$ (step ST12).

$$L_{pls}(h, t) = \begin{cases} A_L \exp(j(2\pi f_0 t + \phi_0)), & hT_{pri} \le t < hT_{pri} + T_0 \\ 0, & \text{otherwise} \end{cases} \quad (2)$$

$$(h = 0, 1, \ldots, H-1)$$

Here, h denotes hit number, and H denotes the number of hits (this number is expressed by Equation (3), and floor(X) is an integer in which the fractional part of a variable X is dropped).

$$H = \text{floor}\left(\frac{T_{obs}}{T_{pri}}\right) \quad (3)$$

Figure 5:
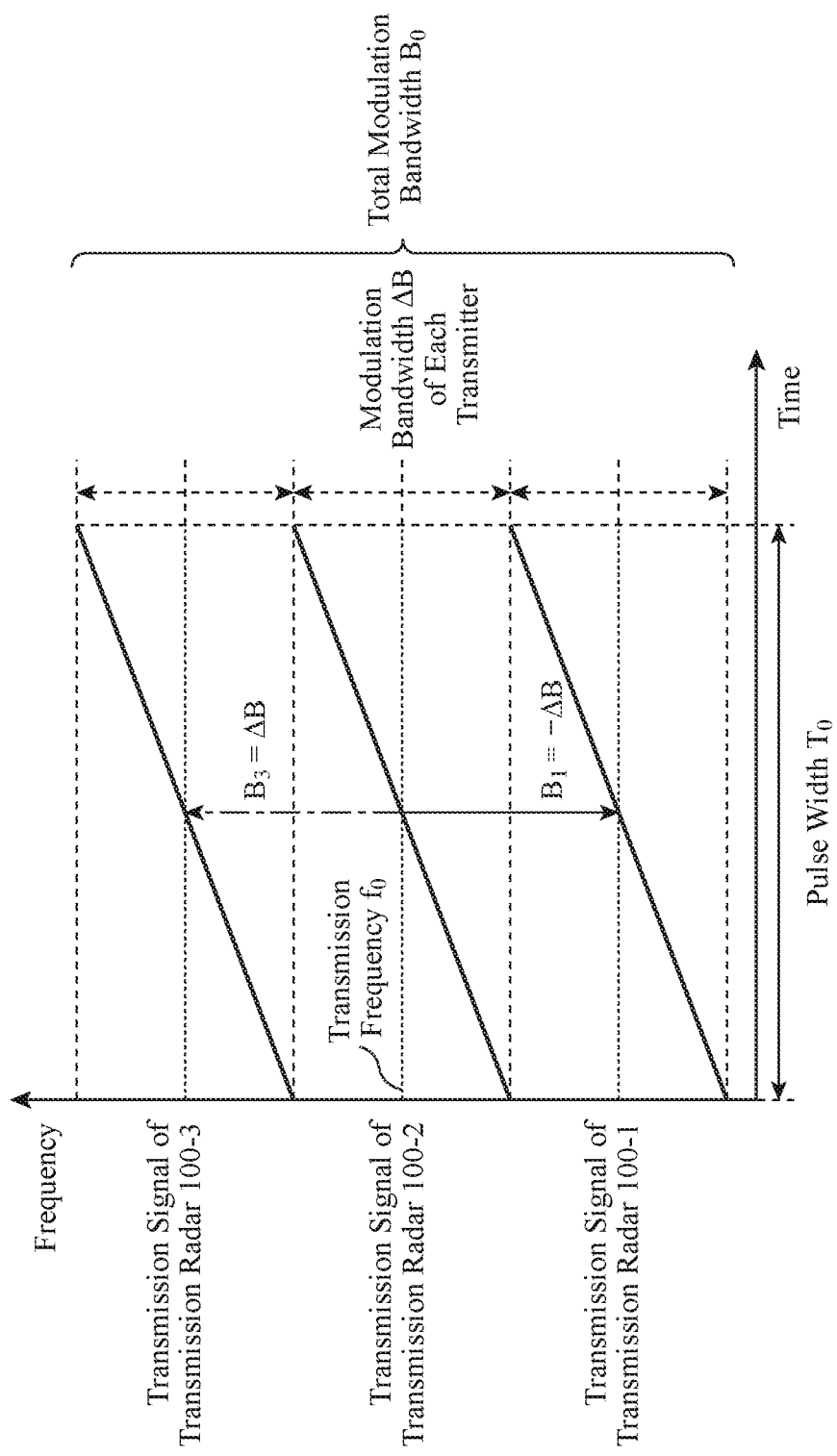
FIG. 5 is an explanatory illustration showing the transmission frequency and the modulation bandwidth of each transmission radar of the radar system according to Embodiment 1 of the present disclosure.

The intrapulse modulation signal generator $124\text{-}n_{Tx}$ generates an intrapulse modulation signal $L_{chp}(n_{Tx}, h, t)$ used for performing frequency modulation on the pulse signal, by using both an amount of frequency modulation $B_{nTx}$ and a modulation bandwidth $\Delta B_{nTx}$ in accordance with Equation (4), and outputs the intrapulse modulation signal to the transmitter $121\text{-}n_{Tx}$ (step ST13). A relationship between the amount of frequency modulation $B_{nTx}$ and the modulation bandwidth $\Delta B_{nTx}$ of each transmission radar is shown in FIG. 5. In Embodiment 1, an effect which is produced when the modulation bandwidths of the transmission radars are the same will be explained. An amount of frequency modulation $B_2$ is 0.

$$L_{chp}(n_{Tx}, h, t) = \quad (4)$$
$$\begin{cases} A_L \exp\left(j2\pi\left(B_{n_{Tx}}t + \frac{\Delta B_{n_{Tx}}}{2T_0}t^2\right)\right), & hT_{pri} \leq t < hT_{pri} + T_0 \\ 0, & \text{otherwise} \end{cases}$$
$$(h = 0, 1, \ldots, H-1)$$
$$(n_{Tx} = 1, 2, \ldots, N_{Tx})$$

The transmitter $121\text{-}n_{Tx}$ generates a transmission RF signal $T_x(n_{Tx}, h, t)$ by using the pulse signal $L_{pls}(h, t)$ and the intrapulse modulation signal $L_{chp}(n_{Tx}, h, t)$ in accordance with Equation (5), and outputs the transmission RF signal to the aerial $110\text{-}n_{Tx}$ (step ST14).

$$Tx(n_{Tx}, h, t) = L_{pls}(h, t)L_{chp}(n_{Tx}, h, t) = \quad (5)$$
$$\begin{cases} A_L \exp\left(j\left\{2\pi\left[(f_0 + B_{n_{Tx}})t + \frac{\Delta B_{n_{Tx}}}{2T_0}t^2\right] + \phi_0\right\}\right), & hT_{pri} \leq t < hT_{pri} + T_0 \\ 0, & \text{otherwise} \end{cases}$$
$$(h = 0, 1, \ldots, H-1)$$
$$(n_{Tx} = 1, 2, \ldots, N_{Tx})$$

After that, the transmission RF signal $T_x(n_{Tx}, h, t)$ is emitted into the air from the aerial $110\text{-}n_{Tx}$ (step ST15).

Figure 6:
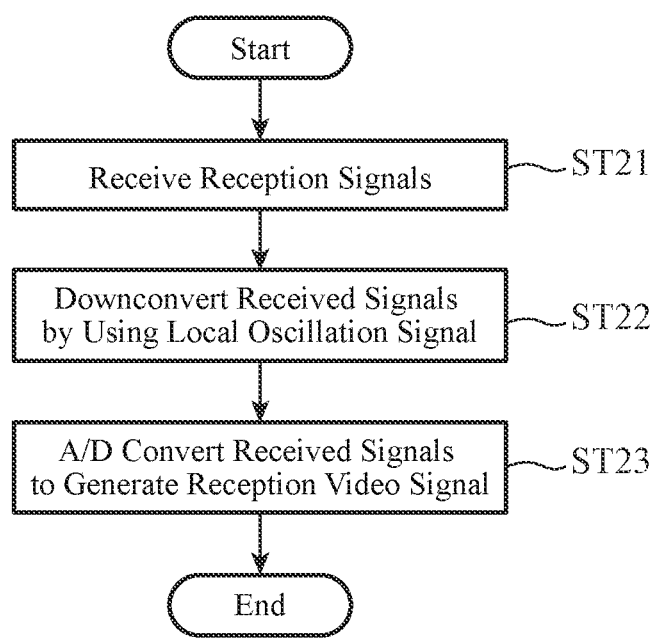
FIG. 6 is a flowchart showing an example of a receiving operation of a receiving unit of a reception radar of the radar system according to Embodiment 1 of the present disclosure.
Figure 7:
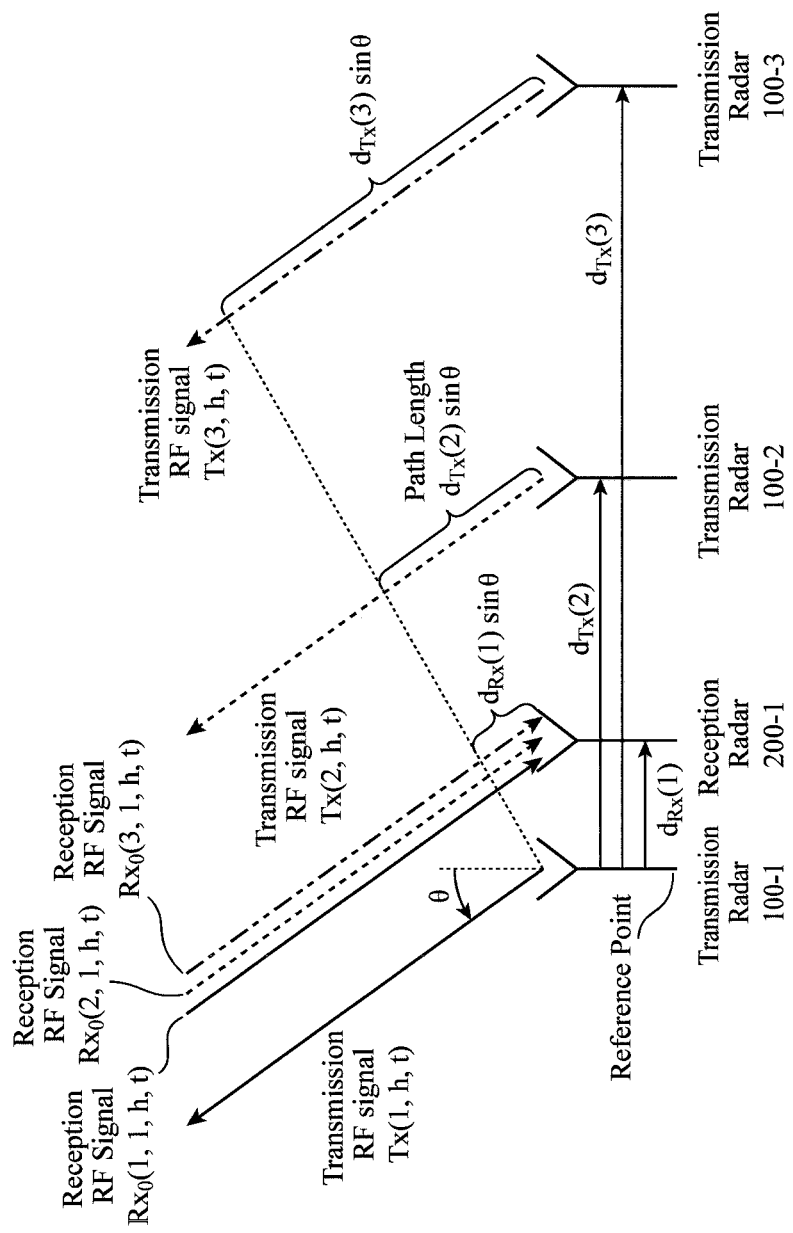
FIG. 7 is an explanatory illustration showing a positional relationship between each transmission radar and the reception radar of the radar system according to Embodiment 1 of the present disclosure, and a relationship between transmitted signals and received signals.

Next, the operation of the reception radar 200-1 will be explained using a flowchart of FIG. 6. Further, a positional relationship between each transmission radar $100\text{-}n_{Tx}$ and the reception radar 200-1 and a relationship between transmission signals and reception signals in the case of the number of transmission radars $N_{Tx}=3$ and the number of reception radars $N_{Rx}=1$ are shown in FIG. 7, and an explanation will be made by reference to FIG. 7.

The transmission RF signals emitted into the air are reflected by a target, and are incident upon the aerial 210-1 as reflected RF signals. Then, the aerial 210-1 receives the reflected RF signals incident thereupon, and outputs the reflected RF signals, as a received RF signal $Rx(n_{Rx}, h, t)$ of the reception radar $200\text{-}n_{Rx}$, the received RF signal being expressed by Equation (6), to the receiver 221-1 (step ST21). Here, $Rx_0(n_{Tx}, n_{Rx}, h, t)$ expressed by Equation (7) denotes a received RF signal received by reception radar $200\text{-}n_{Rx}$ of a reflected RF signal that is emitted from a transmission radar $100\text{-}n_{Tx}$, $A_R$ denotes the amplitude of the reflected RF signal, $R_0$ denotes an initial relative range of the target, v denotes a relative velocity of the target, θ denotes an angle of the target, c denotes the velocity of light, and t' denotes a time within one hit.

$$Rx(n_{Rx}, h, t) = \sum_{n_{Tx}=1}^{N_{Tx}} Rx_0(n_{Tx}, n_{Rx}, h, t) \quad (6)$$
$$(h = 0, 1, \ldots, H-1)$$
$$(n_{Rx} = 1, 2, \ldots, N_{Rx})$$

$$Rx_0(n_{Tx}, n_{Rx}, h, t) = \quad (7)$$
$$\begin{cases} A_R \exp\left(j\left\{2\pi\left[\begin{array}{l}(f_0 + \Delta B_{n_{Tx}})\left(t' - \frac{2(R_0 - vt)}{c}\right) + \\ \frac{\Delta B_{n_{Tx}}}{2T_0}\left(t' - \frac{2(R_0 - vt)}{c}\right)^2\end{array}\right] + \phi_0\right\}\right) & hT_{pri} \leq t < \\ \exp(j\phi_{Tx}(n_{Tx}))\exp(j\phi_{Rx}(n_{Tx}, n_{Rx})), & hT_{pri} + T_0 \\ 0, & \text{otherwise} \end{cases}$$
$$(h = 0, 1, \ldots, H-1)$$
$$(n_{Tx} = 1, 2, \ldots, N_{Tx})$$
$$(n_{Rx} = 1, 2, \ldots, N_{Rx})$$

The phase difference $\phi_{Tx}(n_{Tx})$ of each transmission radar $100\text{-}n_{Tx}$ is expressed by Equation (8), and the phase difference $\phi_{Rx}(n_{Tx}, n_{Rx})$ of the reception radar 200-1 is expressed by Equation (9).

$$\phi_{Tx}(n_{Tx}) = 2\pi(f_0 + B_{n_{Tx}})\frac{d_{Tx}(n_{Tx})\sin\theta}{c} \quad (8)$$
$$(n_{Tx} = 1, 2, \ldots, N_{Tx})$$

$$\phi_{Rx}(n_{Tx}, n_{Rx}) = 2\pi(f_0 + B_{n_{Tx}})\frac{d_{Rx}(n_{Rx})\sin\theta}{c} \quad (9)$$
$$(n_{Tx} = 1, 2, \ldots, N_{Tx})$$
$$(n_{Rx} = 1, 2, \ldots, N_{Rx})$$

The receiver 221-1 downconverts each received RF signal $Rx(n_{Tx}, n_{Rx}, h, t)$ inputted thereto from the aerial 210-1 by using the local oscillation signal $L_0(t)$ expressed by Equation (1), and performs amplification and phase detection after the received RF signal passes through a not-illustrated band pass filter, to generate a reception video signal $V'(n_{Rx}, h, t)$ of the reception radar $200\text{-}n_{Rx}$, the reception video signal being expressed by Equation (10), and outputs the reception video signal to the A/D converter 222-1 (step ST22). Here, $V_0'(n_{Tx}, n_{Rx}, h, t)$ expressed by Equation (11) denotes a reception video signal of a reception video signal of the transmission radar $100\text{-}n_{Tx}$ that is generated by the reception radar $200\text{-}n_{Rx}$, and $A_v$ denotes the amplitude of the reception video signal.

$$V'(n_{Rx}, h, t) = \sum_{n_{Tx}=1}^{N_{Tx}} V_0'(n_{Tx}, n_{Rx}, h, t) = Rx(n_{Rx}, h, t)L_0^*(t) \quad (10)$$

$(h = 0, 1, \ldots, H - 1)$
$(n_{Rx} = 0, 1, \ldots, N_{Rx} - 1)$ $$V_0'(n_{Tx}, n_{Rx}, h, t) = Rx_0(n_{Tx}, n_{Rx}, h, t)L_0^*(t) = \quad (11)$$

$$\begin{cases} A_V \exp\left(j2\pi \begin{bmatrix} B_{n_{Tx}}t' - (f_0 + \Delta B_{n_{Tx}})\frac{2(R_0 - vt)}{c} + \\ \frac{B_{n_{Tx}}}{2T_0}\left(t' - \frac{2(R_0 - vt)}{c}\right)^2 \end{bmatrix}\right) & hT_{pri} \leq t < \\ \exp(j\phi_{Tx}(n_{Tx}))\exp(j\phi_{Rx}(n_{Tx}, n_{Rx})), & hT_{pri} + T_0 \\ 0, & \text{otherwise} \end{cases}$$

$(h = 0, 1, \ldots, H - 1)$
$(n_{Tx} = 1, 2, \ldots, N_{Tx})$
$(n_{Rx} = 1, 2, \ldots, N_{Rx})$ The A/D converter 222-1 performs A/D conversion on the reception video signal V'($n_{Rx}$, h, t) of the reception radar 200-$n_{Rx}$ which is inputted from the receiver 221-1, to generate a reception video signal V($n_{Rx}$, h, m) of the reception radar 200-$n_{Rx}$, the reception video signal being expressed by Equation (12), and outputs the reception video signal to the first signal processor 230-1 (step ST23). Here, $V_0(n_{Tx}, n_{Rx}, h, m)$ denotes a reception video signal which is expressed by Equation (13), and which is a result of the reception radar 200-$n_{Rx}$'s A/D conversion of the reception video signal corresponding to each transmission radar 100-$n_{Tx}$, m denotes a sampling number within the PRI, and M denotes the number of samples within the PRI.

$$V(n_{Rx}, h, m) = \sum_{n_{Tx}=1}^{N_{Tx}} V_0(n_{Tx}, n_{Rx}, h, m) \quad (12)$$

$(m = 0, 1, \ldots, M - 1)$
$(h = 0, 1, \ldots, H - 1)$
$(n_{Rx} = 1, 2, \ldots, N_{Rx})$ $$V_0(n_{Tx}, n_{Rx}, h, m) = \quad (13)$$

$$\begin{cases} A\exp(j2\pi B_{n_{Tx}}m\Delta t) \\ \exp\left(-j2\pi(f_0 + \Delta B_{n_{Tx}})\frac{2(R_0 - v(hT_{pri} + m\Delta t))}{c}\right) & hT_{pri} \leq \\ \exp\left(j2\pi \frac{B_{n_{Tx}}}{2T_0}\left(m\Delta t - \frac{2(R_0 - v(hT_{pri} + m\Delta t))}{c}\right)^2\right) & t < \\ \exp(j\phi_{Tx}(n_{Tx}))\exp(j\phi_{Rx}(n_{Tx}, n_{Rx})), & hT_{pri} + T_0 \\ 0, & \text{otherwise} \end{cases}$$

Figure 8:
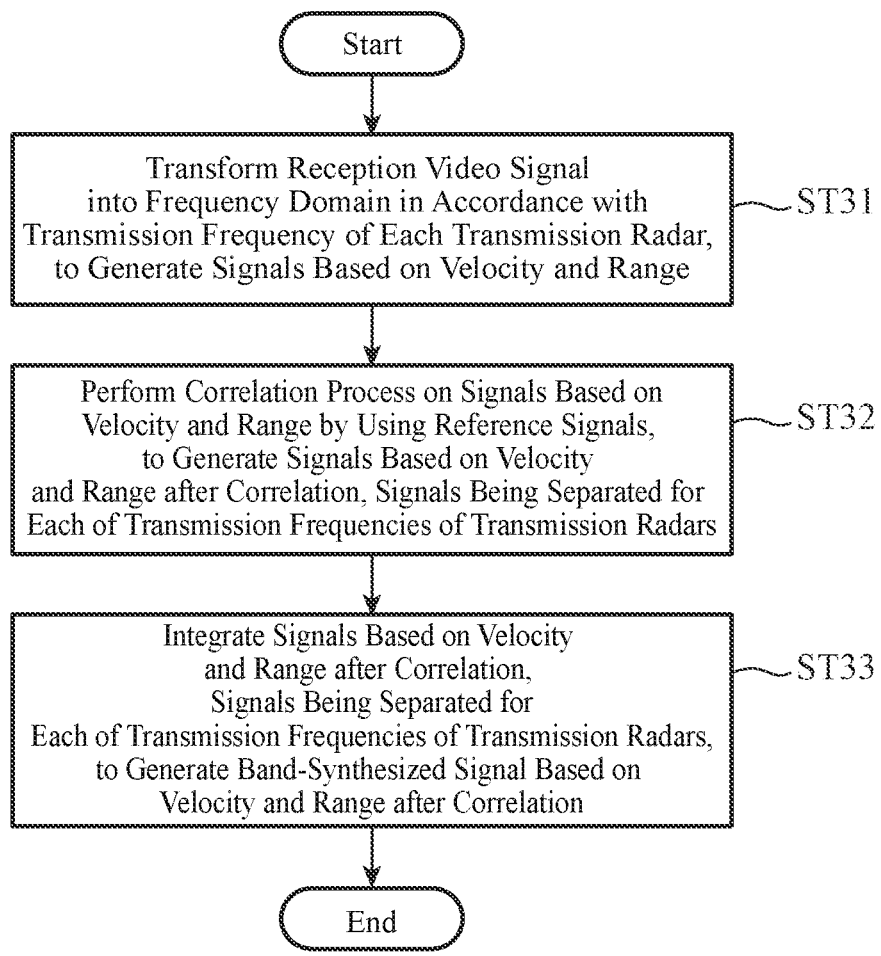
FIG. 8 is a flowchart showing an example of signal processing performed by the radar system according to Embodiment 1 of the present disclosure.

$(m = 0, 1, \ldots, M - 1)$
$(h = 0, 1, \ldots, H - 1)$
$(n_{Tx} = 1, 2, \ldots, N_{Tx})$
$(n_{Rx} = 1, 2, \ldots, N_{Rx})$ Signal processing performed by the first signal processor 230-1 will be explained by reference to a flowchart of FIG. 8. In the flowchart of FIG. 8, step ST31 shows a process performed by the frequency domain transforming unit 231-1, step ST32 shows a process performed by the correlation unit 232-1, and step ST33 shows a process performed by the integrating unit 233-1.

The reception video signal V($n_{Rx}$, h, m) of the reception radar 200-$n_{Rx}$ is inputted to the frequency domain transforming unit 231-1 from the A/D converter 222-1.

As shown by Equation (12), the reception video signal V($n_{Rx}$, h, m) of the reception radar 200-$n_{Rx}$ is a superimposed signal of signals with the different center frequencies modulated by the transmission radars. The first signal processor 230-1 makes it possible to improve the detection performance by separating the reception signal, which is a resultant signal that is transmitted by the multiple transmission radars, reflected by a target and then received, into reception signals for the respective transmission radars, and performing a coherent integration.

First, a problem associated with conventional radar systems will be explained.

In general, in order to separate a reception signal into signals corresponding to transmission radars, a process of determining a correlation between a reference signal based on the modulation component for each transmission radar and the reception signal, i.e., pulse compression is performed. FIGS. 9A, 9B, and 9C show signals after correlation which correspond to the transmission radars in a case in which there is no influence of the Doppler frequency. FIG. 9A shows a signal after correlation which corresponds to the transmission radar 100-1, FIG. 9B shows a signal after correlation which corresponds to the transmission radar 100-2, and FIG. 9C shows a signal after correlation which corresponds to the transmission radar 100-3. Because the bands differ among the transmission radars, the separation into reception signals corresponding to the transmission radars can be performed, as shown in these FIGS. 9A to 9C. It is seen that integration is performed with respect to a target relative range. Further, a cross correlation occurs under the influence of adjacent bands, and a sidelobe rises slightly (in the figures, refer to each section 901).

FIGS. 9D, 9E, and 9F show signals after correlation which correspond to the transmission radars in a case in which there is an influence of the Doppler frequency. FIG. 9D shows a signal after correlation which corresponds to the transmission radar 100-1, FIG. 9E shows a signal after correlation which corresponds to the transmission radar 100-2, and FIG. 9F shows a signal after correlation which corresponds to the transmission radar 100-3. Because the bands differ among the transmission radars, the separation into reception signals corresponding to the transmission radars can be performed, as shown in these FIGS. 9D to 9F. However, because an influence occurs in the target relative range under the influence of the Doppler frequency, and the target relative range is compressed to a range $\Delta R_{PC}(n_{Tx})$ which is different from the target relative range by a range shown by Equation (14), there arises a problem that range measurement performance degrades. Further, while a sidelobe rises due to a cross correlation, as shown by sections 901, there is an influence of the Doppler frequency and a sidelobe further rises due to a cross correlation, as shown by sections 902 in FIGS. 9E and 9F.

Here, $\Delta\tau_{PC}(n_{Tx})$ denotes a delay time corresponding to the range $\Delta R_{PC}(n_{Tx})$ different from the target relative range, and $\mp$ shows that when the modulation is performed in such a way that the frequency increases as shown in FIG. 5, the negative sign is used, and when the modulation is performed in such a way that the frequency decreases, the positive sign is used. The frequency $f_d(n_{Tx})$ denotes a Doppler frequency expressed by Equation (15) where the target relative velocity is v at the transmission frequency of transmission radar 100-$n_{Tx}$.

$$\Delta\tau_{PC}(n_{Tx}) = \frac{2}{c}\Delta R_{PC}(n_{Tx}) = \mp \quad (14)$$

$$f_d(n_{Tx})\frac{T_0}{\Delta B_{n_{Tx}}} = \mp(f_0 + B_{n_{Tx}})\frac{2v}{c}\frac{T_0}{\Delta B_{n_{Tx}}}$$

$(n_{Tx} = 1, 2, \ldots, N_{Tx})$ $$f_d(n_{Tx}) = (f_0 + B_{n_{Tx}})\frac{2v}{c} \quad (15)$$

$$(n_{Tx} = 1, 2, \ldots, N_{Tx})$$

Figure 10A:
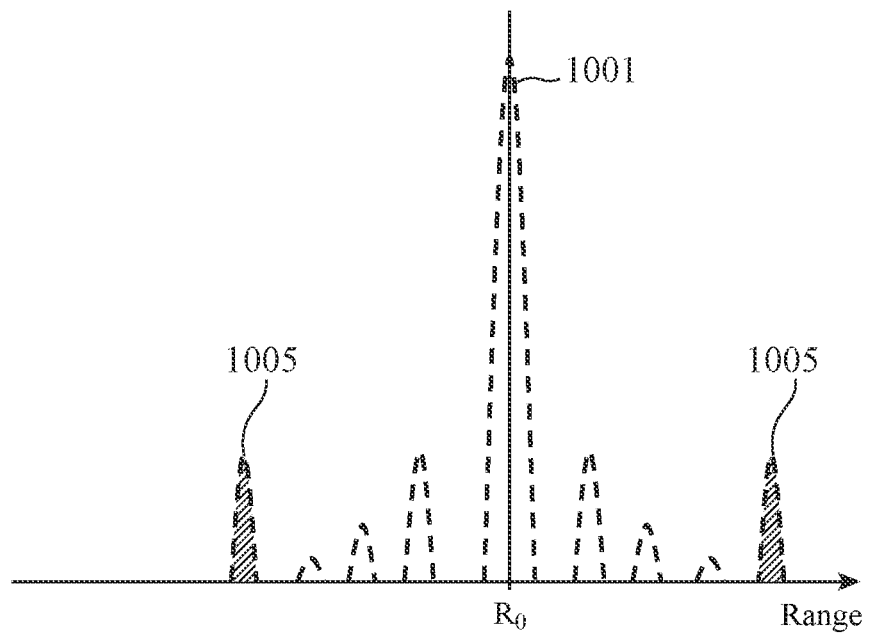
FIGS. 10A and 10B are explanatory illustrations showing an influence of a Doppler frequency when band synthesis is performed on signals after correlation corresponding to the transmission frequencies.
Figure 10B:
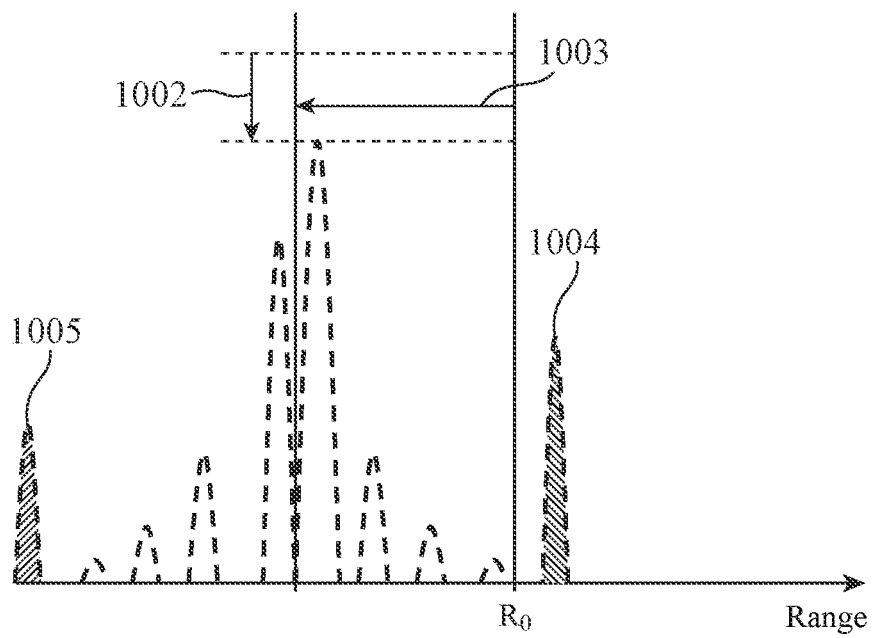

An influence of the Doppler frequency in a case of performing band synthesis is shown in FIG. 10. When there is no influence of the Doppler frequency, signals in adjacent bands are synthesized coherently, the power is increased, the detection performance is improved, and the range resolution is improved (in the figure, refer to a section 1001), as shown in FIG. 10A. In contrast, when there is an influence of the Doppler frequency, there arises a problem that the phases of signals after correlation in adjacent bands differ, and an integration loss occurs (in the figure, refer to an arrow 1002), as shown in FIG. 10B. When there is an influence of the Doppler frequency, there arises a further problem that the compressed range differs from the target relative range (in the figure, refer to an arrow 1003). There is another problem that a rise of an unnecessary peak is caused by a cross correlation in accordance with the Doppler frequency, in addition to a cross correlation between adjacent bands, and a sidelobe further rises (in the figure, refer to a section 1004). In FIGS. 10A and 10B, each section 1005 shows a part in which a sidelobe rises due to a cross correlation.

Figure 11:
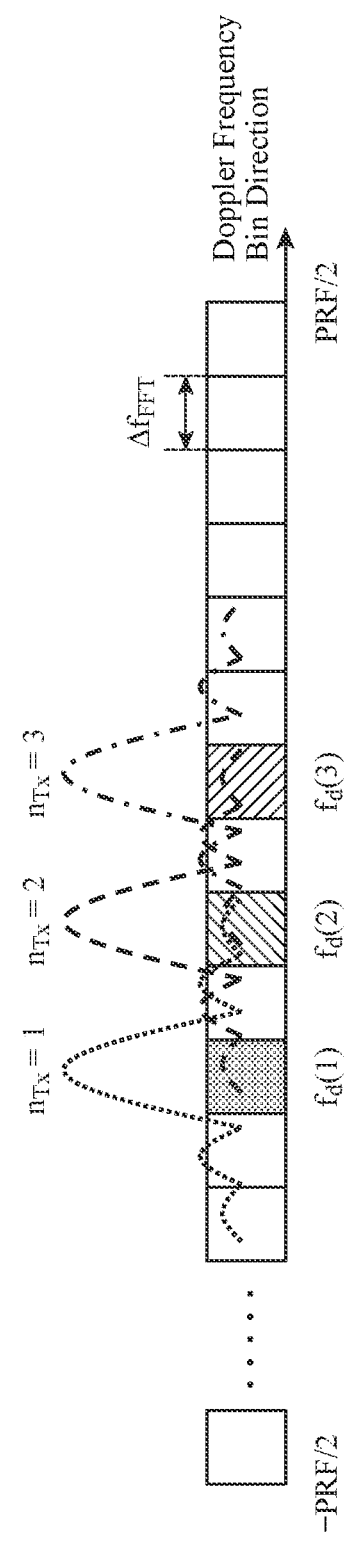
FIG. 11 is an explanatory illustration showing results of a transform into a frequency domain which is performed on reception video signals corresponding to the transmission frequencies of the transmission radars by using an FFT.

A Doppler frequency is acquired by transforming a reception video signal into signals in a frequency domain in a hit direction. However, in the case of a reception video signal which is received with different transmission frequencies, when a fast Fourier transform (FFT) is performed as the transform into the frequency domain, different Doppler frequencies are acquired, as shown in FIG. 11, and it is therefore difficult to perform detection and synthesis. More specifically, in the FFT, the frequency sampling intervals are the same independently of the transmission frequencies, and the velocity sampling intervals differ dependently on the transmission frequencies.

The frequency domain transforming unit 231-1 according to Embodiment 1 uses chirp z-transform (CZT) in order to transform the reception video signal $V(n_{Rx}, h, m)$ of the reception radar 200-$n_{Rx}$ into signals in the frequency domain while changing a Doppler frequency interval for each of the different transmission frequencies in such a way that the Doppler velocity bin is the same for each of the different transmission frequencies, for the purpose of coherently performing band synthesis on the reception video signal $V(n_{Rx}, h, m)$ of the reception radar 200-$n_{Rx}$. FIG. 12 shows results of the transform of a reception video signal corresponding to the transmission frequency of each transmission radar 100-$n_{Tx}$ into the frequency domain by using the CZT. Although the reception video signal is sampled only during the pulse width per each hit, FIG. 12 shows only one sample for the sake of explanation. FIG. 12A shows an example of performing frequency transformation on the reception signal corresponding to the transmission radar 100-1 so as to belong to a velocity bin of target relative velocity v. FIG. 12B shows a case for the transmission radar 100-2, and FIG. 12C shows a case for the transmission radar 100-3. In these FIGS. 12A to 12C, $\Delta v_{CZT}$ denotes a velocity sample interval in the frequency domain. The frequency domain transforming unit 231-1 operates in such a way that the Doppler velocity bin of each of the signals after transform into the frequency domain is the same, by changing the transform function of the CZT on the basis of the transmission frequencies.

The frequency domain transforming unit 231-1 transforms the reception video signal $V(n_{Rx}, h, m)$ of the reception radar 200-$n_{Rx}$ into the frequency domain, by performing the CZT expressed by Equation (16) on the reception video signal, to generate a signal $F_{CZT}(n_{Tx}, n_{Rx}, h_{czt}, m)$ based on a velocity and a range. Here, $Z_{n_{Tx}}^{-h}$ denotes the transform function for CZT corresponding to each transmission frequency $(f_0+B_{n_{Tx}})$, $A_{n_{Tx}}$ denotes a transform start phase corresponding to each transmission frequency $(f_0+B_{n_{Tx}})$ (Equation (17)), $W_{n_{Tx}}^{-h_{czt}}$ denotes a transform range function for CZT corresponding to each transmission frequency $(f_0+B_{n_{Tx}})$ (Equation (18)), $v_{st}$ denotes a transform start velocity at which the transform is started, $v_{en}$ denotes a transform end velocity at which the transform is ended, $H_{czt}$ denotes the number of samples after CZT, and $f_{samp}$ denotes a sampling frequency (Equation (19)). A relative velocity $v_{CZT}(h_{czt})$ at the velocity bin number $h_{czt}$ after transform into the frequency domain is expressed by Equation (20).

$$F_{CZT}(n_{Tx}, n_{Rx}, h_{czt}, m) = V(n_{Rx}, h, m)z_{n_{Tx}}^{-h} = \quad (16)$$

$$V(n_{Rx}, h, m)\left(A_{n_{Tx}} W_{n_{Tx}}^{-h_{czt}}\right)^{-h} =$$

$$\left\{\sum_{h=0}^{H-1}\left[\sum_{n_{Tx}=1}^{N_{Tx}} V_0(n_{Tx}, n_{Rx}, h, m)\right]\right\}\left(A_{n_{Tx}} W_{n_{Tx}}^{-h_{czt}}\right)^{-h}$$

$$(m = 0, 1, \ldots, M-1)$$

$$(h_{czt} = 0, 1, \ldots, H_{czt} - 1)$$

$$(n_{Tx} = 1, 2, \ldots, N_{Tx})$$

$$(n_{Rx} = 1, 2, \ldots, N_{Rx})$$

$$A_{n_{Tx}} = \exp\left(j2\pi(f_0 + B_{n_{Tx}})\frac{2v_{st}}{c}\right) \quad (17)$$

$$(n_{Tx} = 1, 2, \ldots, N_{Tx})$$

$$W_{n_{Tx}}^{-h_{czt}} = \exp\left(-j2\pi(f_0 + B_{n_{Tx}})\frac{2(v_{en} - v_{st})}{c}\frac{-h_{czt}}{H_{czt}f_{samp}}\right) \quad (18)$$

$$(h_{czt} = 0, 1, \ldots, H_{czt} - 1)$$

$$(n_{Tx} = 1, 2, \ldots, N_{Tx})$$

$$f_{samp} = \frac{1}{\Delta t} \quad (19)$$

$$v_{czt}(h_{czt}) = v_{st} + h_{czt}\Delta v_{czt} \quad (20)$$

Through the process according to Equations (16) to (18) which is performed by the frequency domain transforming unit 231-1, for any transmission frequency $(f_0+B_{n_{Tx}})$, the signal $F_{CZT}(n_{Tx}, n_{Rx}, h_{czt}, m)$ based on a velocity and a range is sampled, with respect to a frequency direction, over the velocity range from the transform start velocity $v_{st}$ to the transform end velocity $v_{en}$ at same velocity sampling interval $\Delta v_{czt}$, and the target is sampled into the same Doppler velocity bin, as shown in FIG. 12. Further, the number $H_{czt}$ of samples after CZT can be set to any number, and a desired sampling interval can be set up. The transform start velocity $v_{st}$ and the transform end velocity $v_{en}$ can be freely set on the basis of assumed relative velocities.

The frequency domain transforming unit 231-1 can process the CZT expressed by Equation (16) at a higher speed than that at which a discrete Fourier transform (DFT) is performed, by implementing the CZT by using a convolution in the frequency domain which is expressed by Equation (21) and which uses a fast Fourier transform (FFT) and an inverse fast Fourier transform (IFFT: Inverse FFT). The sign * in Equation (21) denotes the convolution.

$$F_{CZT}(n_{Tx}, n_{Rx}, h_{czt}, m) = \quad (21)$$

$$W_{n_{Tx}}^{\frac{h_{czt}^2}{2}} IFFT\left[FFT\left(V(n_{Rx}, h, m)A_{n_{Tx}}^{-h} W_{n_{Tx}}^{\frac{h^2}{2}}\right) * FFT\left(W_{n_{Tx}}^{\frac{h^2}{2}}\right)\right]$$

Figure 13:
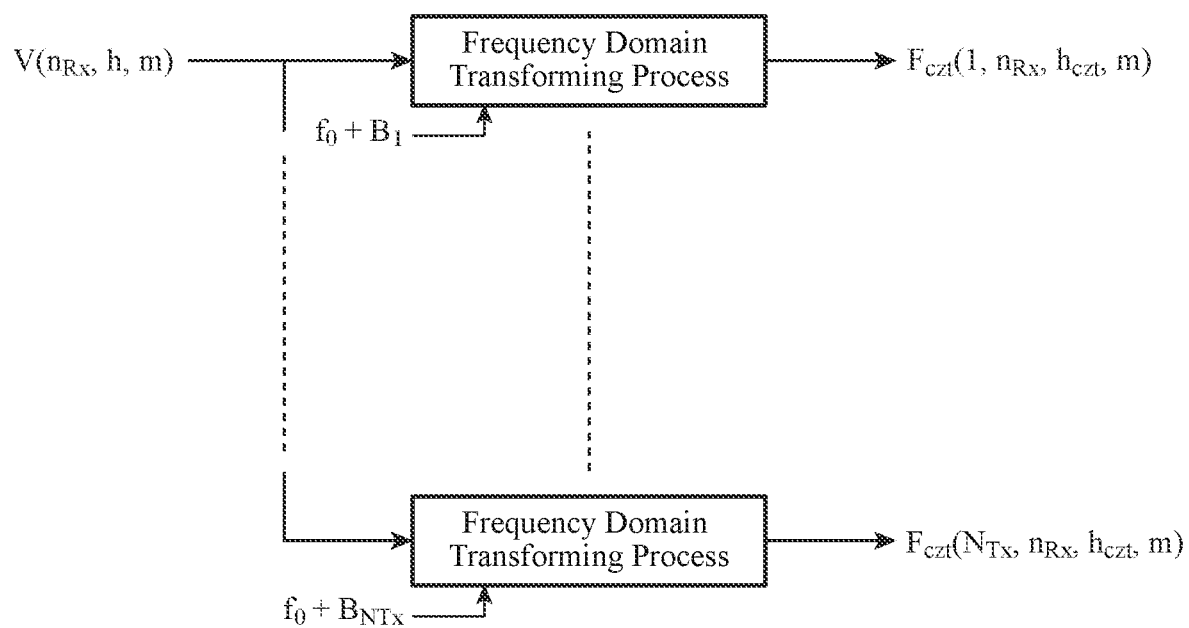
FIG. 13 is an explanatory illustration showing a relationship between an input and outputs in the frequency domain transforming process.
Figure 14A:
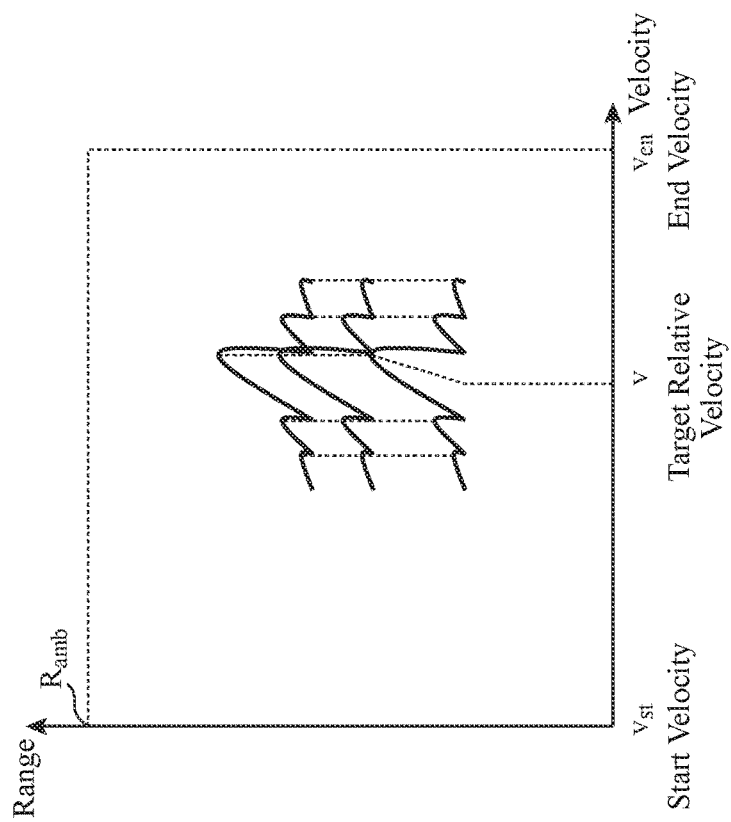
FIGS. 14A and 14B are explanatory illustrations showing a reception video signal, and spectra of signals based on a velocity and a range.
Figure 14B:
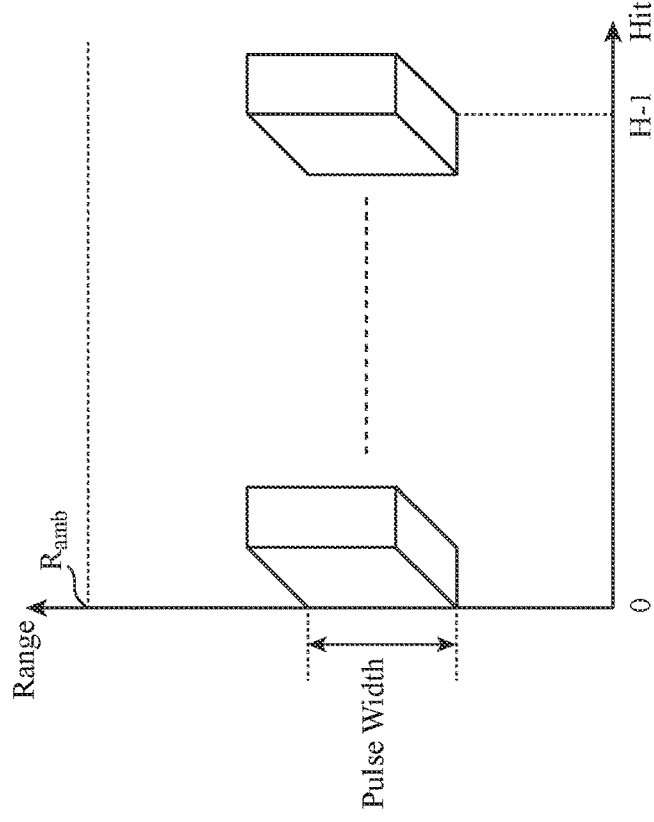

A relationship between inputs and outputs in the frequency domain transforming process is shown in FIG. 13. Further, the reception video signal $V(n_{Rx}, h, m)$ and the spectra of signal $F_{CZT}(n_{Tx}, n_{Rx}, h_{czt}, m)$ each based on a velocity and a range are shown in FIG. 14. FIG. 14A shows the reception video signal and FIG. 14B shows each signal based on a velocity and a range, and in both the figures a range value shown by a dotted line is a range $R_{amb}$ measurable without ambiguity. This FIG. 14 shows that the reception video signal corresponding to each transmission frequency appears in the target relative velocity bin.

When it is feared that each signal $F_{CZT}(n_{Tx}, n_{Rx}, h_{czt}, m)$ based on a velocity and a range is buried in a sidelobe such as a clutter, the frequency domain transforming unit 231-1 performs a window function process in accordance with Equation (22), to generate a reception video signal $V'(n_{Rx}, h, m)$ after window function process. Here, an explanation is made using a humming window $w_{ham}(m)$ expressed by Equation (23). A window function other than the humming window can be used. By performing the window function process, a sidelobe in a velocity direction of each signal after transform into the frequency domain can be reduced, and the target can be prevented from being buried in a sidelobe.

When the window function process is performed, the frequency domain transforming unit 231-1 substitutes the reception video signal $V(n, h, m)$ with the reception video signal $V'(n_{Rx}, h, m)$ obtained after window function process, and performs the transform into the frequency domain in accordance with Equation (16) or (21), to generate signals $F_{CZT}(n_{Tx}, n_{Rx}, h_{czt}, m)$ based on a velocity and a range.

$$V'(n_{Rx}, h, m) = V(n_{Rx}, h, m)w_{ham}(h) \quad (22)$$
$$(m = 0, 1, \ldots, M-1)$$
$$(n = 0, 1, \ldots, N-1)$$

$$w_{ham}(m) = 0.54 + 0.46\cos\left(\frac{2\pi m}{M-1}\right) \quad (23)$$
$$(m = 0, 1, \ldots, M-1)$$

The frequency domain transforming unit 231-1 outputs the signals $F_{CZT}(n_{Tx}, n_{Rx}, h_{czt}, m)$ based on a velocity and a range to the correlation unit 232-1.

The correlation unit 232-1 performs processes of determining correlations between the respective reference signals based on both each transmission frequency and the velocity corresponding to each velocity bin, and the respective signals $F_{CZT}(n_{Tx}, n_{Rx}, h_{czt}, m)$ based on a velocity and a range, i.e., pulse compression, to generate signals $R_{PC}(n_{Tx}, n_{Rx}, h_{czt}, l)$ based on a velocity and a range after correlation, the signals being separated for each of the transmission frequencies.

Figure 15:
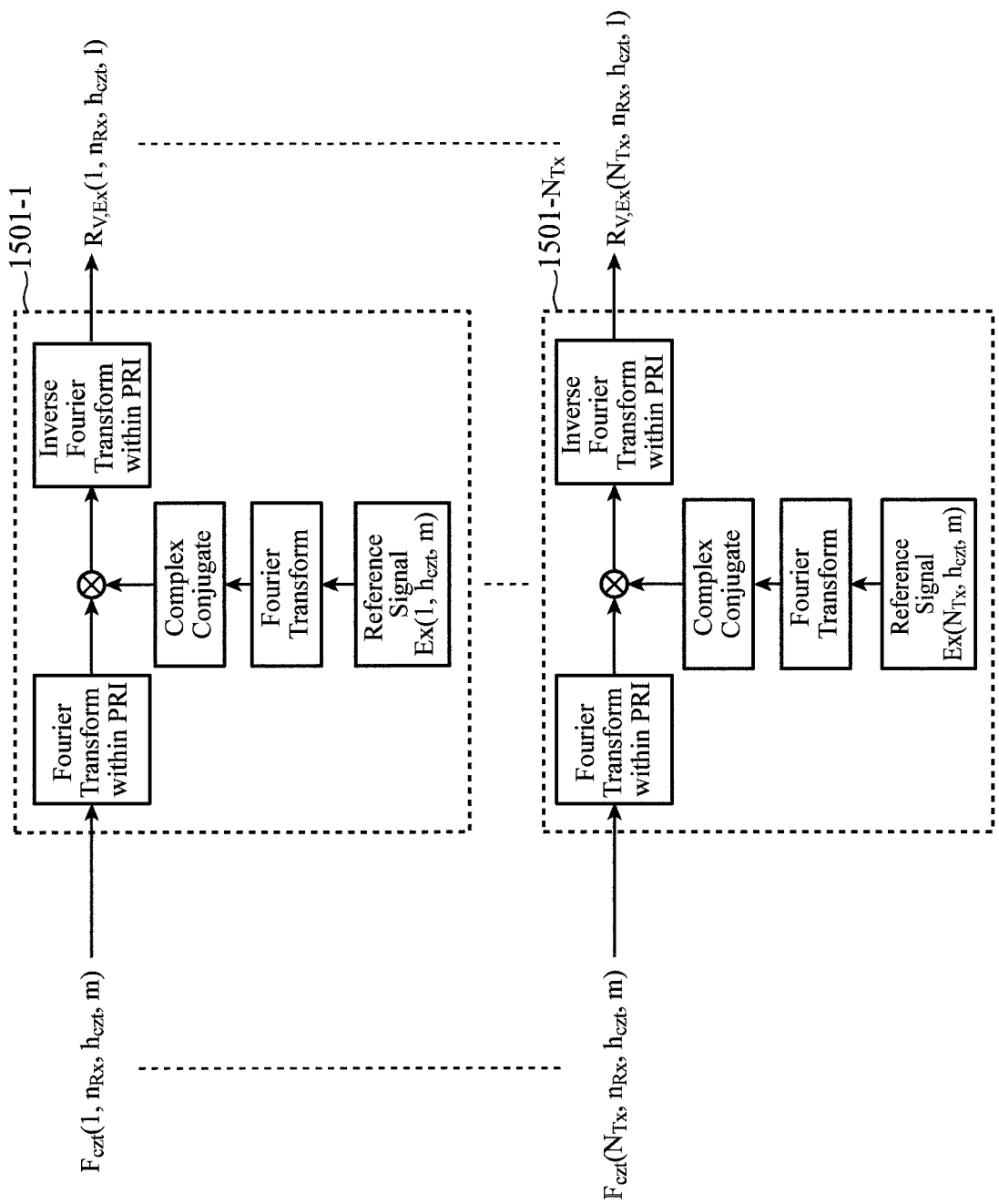
FIG. 15 is an explanatory illustration showing a relationship between inputs and outputs in a correlation process.
Figure 16:
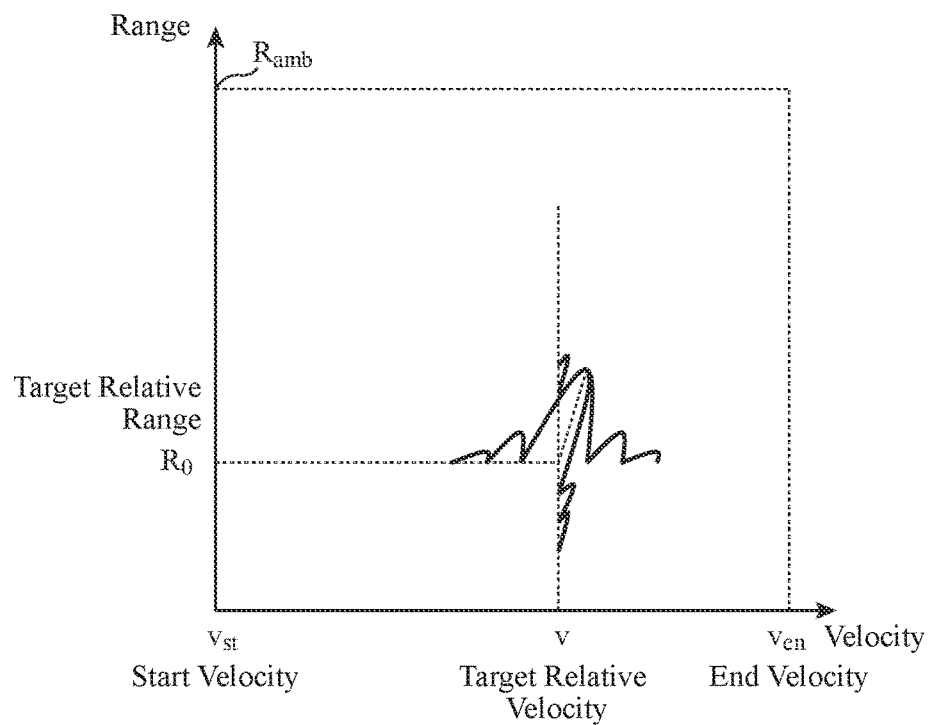
FIG. 16 is an explanatory illustration showing a spectrum of a signal based on a velocity and a range after correlation.

Referring to FIGS. 15 and 16, the processes of determining correlations in the frequency domain between the signals $F_{CZT}(n_{Tx}, n_{Rx}, h_{czt}, m)$ based on a velocity and a range, and the reference signal $Ex(n_{Tx}, h_{czt}, m)$ based on the velocity corresponding to each velocity bin, i.e., pulse compressions which are performed by the correlation unit 232-1 will be explained. FIG. 15 shows that a processing block 1501-1 performs the pulse compression on the signal $F_{CZT}(1, n_{Rx}, h_{czt}, m)$ based on a velocity and a range, this signal corresponding to the transmission radar 100-1 and the reception radar 200-$n_{Rx}$, and a processing block 1501-$N_{Tx}$ performs the pulse compression on the signal $F_{CZT}(N_{Tx}, n_{Rx}, h_{czt}, m)$ based on a velocity and a range, this signal corresponding to the transmission radar 100-$N_{Tx}$ and the reception radar 200-$n_{Rx}$. Further, FIG. 16 shows a signal based on a velocity and a range after correlation, and a range value shown by a dotted line is a range $R_{amb}$ measurable without ambiguity.

Figure 17:
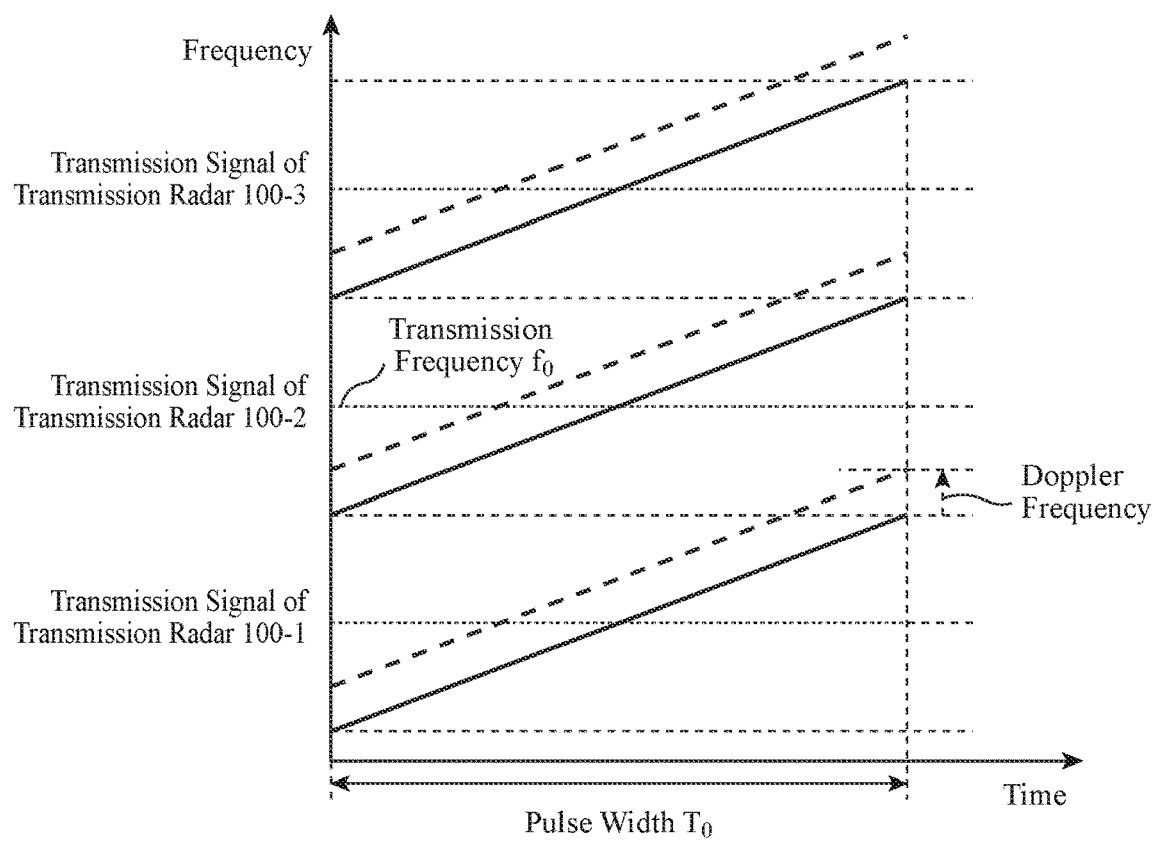
FIG. 17 is an explanatory illustration showing transmitted signals and received signals which are under the influence of a Doppler frequency.

As shown in FIG. 17, when the target has a Doppler frequency, the correlation is low if no Doppler frequency is included in the reference signal when the pulse compression is performed. In FIG. 17, solid lines show the transmitted signals of the transmission radars 100-1 to 100-3, and broken lines show the received signals each of which has an influence of the Doppler frequency. Further, there is a problem that a cross correlation between adjacent bands becomes high, and an unnecessary peak becomes high as shown by the curve 1004 of FIG. 10B and the range deviates as shown by the arrow 1003.

In order to solve this problem, the correlation unit 232-1 generates a reference signal $Ex(n_{Tx}, h_{czt}, m)$ including, in addition to the amount of frequency modulation $B_{nTx}$ and the modulation bandwidth $\Delta B_{nTx}$ of each transmission radar 100-$n_{Tx}$ which are the same as those for the intrapulse modulation signal $L_{chp}(n_{Tx}, t)$, the Doppler frequency corresponding to the velocity in each velocity bin, in accordance with Equation (24). The second term in Equation (24) shows the Doppler frequency corresponding to the velocity in each velocity bin, and the transform into the frequency domain in the hit direction is performed by the frequency domain transforming unit 231-1 before the pulse compression, so that the pulse compression can be performed on the signals which are integrated into the target relative velocity bin without the influence of the Doppler frequency. Further, because a reference signal for each transmission frequency and for each velocity corresponding to a velocity bin is generated, as shown in Equation (24), the pulse compression can be performed on the reception video signal from the target, the reception video signal corresponding to both each transmission frequency and each velocity, without the influence of the Doppler frequency.

$$Ex(n_{Tx}, h_{czt}, m) = \begin{cases} A_E \exp(j2\pi(B_{n_{Tx}} m\Delta t + \\ \quad \frac{\Delta B_{n_{Tx}}}{2T_0} m^2 \Delta t^2)) \\ \exp(j2\pi(f_0 + B_{n_{Tx}}) \\ \quad \frac{2v_{czt}(h_{czt})}{c} m\Delta t), \\ 0 \le m\Delta t \le T_0 \\ 0, \quad \text{otherwise} \end{cases} \quad (24)$$

$$(m = 0, 1, \ldots, M)$$
$$(h_{czt} = 0, 1, \ldots, H_{czt} - 1)$$
$$(n_{Tx} = 1, 2, \ldots, N_{Tx})$$

Further, in Embodiment 1, the transform into the frequency domain in the hit direction is performed by the frequency domain transforming unit 231-1 before the pulse compression. More specifically, each signal on which the pulse compression is to be performed is not one corresponding to a single hit, but one acquired during an observation time period and corresponding to H hits. In order to prevent a phase based on the target displacement distance in H hits during the observation time from exerting an influence different for each of the transmission frequencies, a reference signal $Ex(n_{Tx}, h_{czt}, m)$ also including the phase (third term in Equation (25)) based on the target displacement distance in H hits can be generated in accordance with Equation (25).

$$Ex(n_{Tx}, h_{czt}, m) = \begin{cases} A_E \exp(j2\pi(B_{n_{Tx}} m\Delta t + \frac{\Delta B_{n_{Tx}}}{2T_0} m^2 \Delta t^2)) \\ \exp(j2\pi(f_0 + B_{n_{Tx}}) \frac{2v_{czt}(h_{czt})}{c} m\Delta t) \\ \exp(-j2\pi(f_0 + B_{n_{Tx}}) \frac{2v_{czt}(h_{czt})}{c} \frac{T_{pri}H}{2}), \\ 0 \le m\Delta t \le T_0 \\ 0, \quad \text{otherwise} \end{cases} \quad (25)$$

$(m = 0, 1, \ldots, M)$ $(h_{czt} = 0, 1, \ldots, H_{czt} - 1)$ $(n_{Tx} = 1, 2, \ldots, N_{Tx})$ The correlation unit 232-1 performs a fast Fourier transform (FFT) on each signal $F_{CZT}(n_{Tx}, n_{Rx}, h_{czt}, m)$ based on a velocity and a range and each reference signal $Ex(n_{Tx}, h_{czt}, m)$ in accordance with Equations (26) and (27), respectively, and, after that, multiplies the signals (Equation (28)). Here, * denotes a complex conjugate, $k_r$ denotes a sampling number within the PRI, and $M_{fft}$ denotes the number of FFT points in the correlation process.

$$F_V(n_{Tx}, n_{Rx}, h_{czt}, k_r) = \quad (26)$$
$$\sum_{m=0}^{M_{fft}-1} V(n_{Tx}, m_{Rx}, h_{czt}, m) \exp\left(-j2\pi \frac{m_{fft}}{M_{fft}} k_r\right)$$

$(k_r = 0, 1, \ldots, M_{fft} - 1)$ $(h_{czt} = 0, 1, \ldots H_{czt} - 1)$ $(n_{Tx} = 1, 2, \ldots, N_{Tx})$ $(n_{Rx} = 1, 2, \ldots, N_{Rx})$ $$F_{Ex}(n_{Tx}, h_{czt}, k_r) = \quad (27)$$
$$\sum_{m=0}^{M_{fft}-1} Ex(n_{Tx}, h_{czt}, m) \exp\left(-j2\pi \frac{m_{fft}}{M_{fft}} k_r\right)$$

$(k_r = 0, 1, \ldots, M_{fft} - 1)$ $(h_{czt} = 0, 1, \ldots H_{czt} - 1)$ $(n_{Tx} = 1, 2, \ldots, N_{Tx})$ $(n_{Rx} = 1, 2, \ldots, N_{Rx})$ $$F_{V \cdot Ex}(n_{Tx}, n_{Rx}, h_{czt}, k_r) = \quad (28)$$
$$F_V(n_{Tx}, n_{Rx}, h_{czt}, k_r) F_{Ex}{}^*(n_{Tx}, h_{czt}, k_r)$$

Figure 18A:
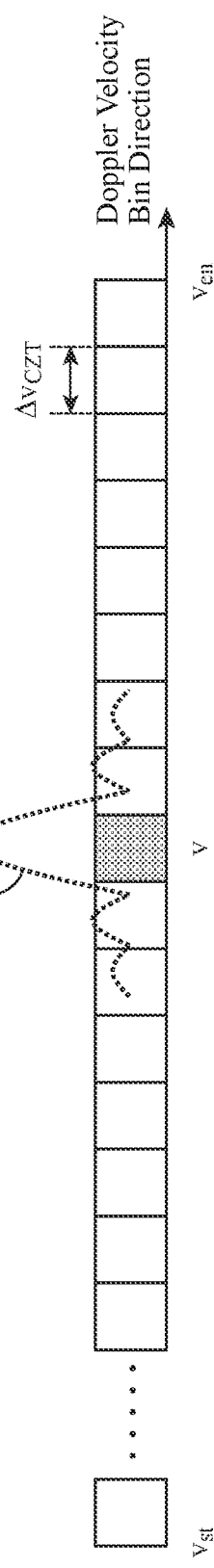
FIGS. 18A, 18B, and 18C are explanatory illustrations showing spectra of signals based on a velocity and a range after correlation, at a target relative range for each of the transmission frequencies.
Figure 18B:
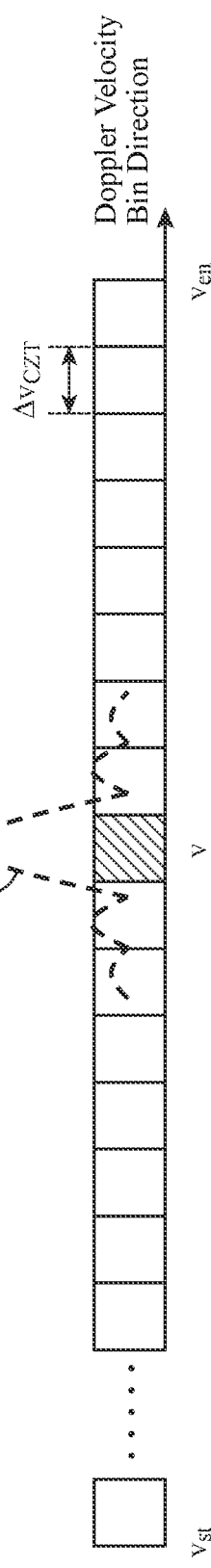
Figure 18C:
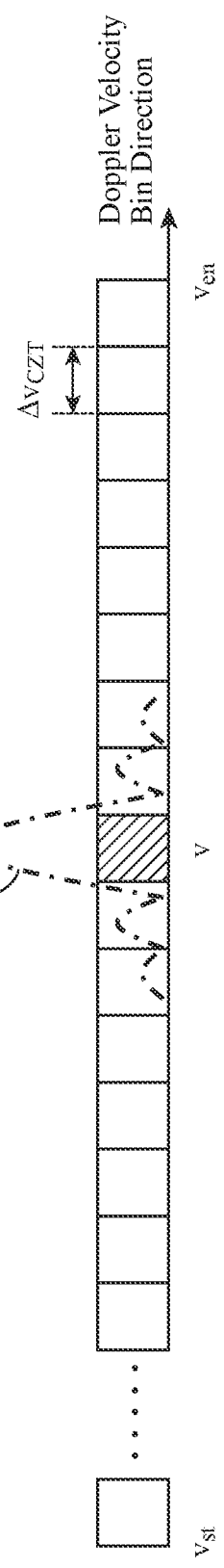

$(k_r = 0, 1, \ldots, M_{fft} - 1)$ $(h_{czt} = 0, 1, \ldots H_{czt} - 1)$ $(n_{Tx} = 1, 2, \ldots, N_{Tx})$ $(n_{Rx} = 1, 2, \ldots, N_{Rx})$ Finally, the correlation unit 232-1 performs an inverse fast Fourier transform (IFFT) on a multiplication result $F_{V \cdot Ex}(n_{Tx}, n_{Rx}, h_{czt}, k_r)$ in accordance with Equation (29), to generate, as a result of the correlation process, signals $R_{PC}(n_{Tx}, n_{Rx}, h_{czt}, l)$ based on a velocity and a range after correlation, the signals being separate for each of the transmission frequencies. As shown in FIG. 18, the pulse compression is performed on the reception signal corresponding to the reference signal corresponding to each transmission radar 100-$n_{Tx}$, and the reception signals corresponding to the other transmission radars whose bands differ from that of the transmission radar 100-$n_{Tx}$ have small correlations and are suppressed and the separation into the reception signals corresponding to the transmission frequencies can be performed. Here, FIG. 18A shows the signal after pulse compression which corresponds to $n_{Tx}=1$ in the transmission radar 100-$n_{Tx}$, FIG. 18B shows the signal after pulse compression which corresponds to $n_{Tx}=2$, and FIG. 18C shows the signal after pulse compression which corresponds to $n_{Tx}=3$. In each of these figures, the signals in the different bands are compressed, and only the reception signal corresponding to the transmission radar 100-$n_{Tx}$ is separated and pulse-compressed, as shown by signals 1801, 1802, and 1803.

The correlation unit 232-1 outputs the signals $R_{PC}(n_{Tx}, n_{Rx}, h_{czt}, l)$ based on a velocity and a range after correlation, the signals being separated for each of the transmission frequencies, to the integrating unit 233-1.

$$R_{PC}(n_{Tx}, n_{Rx}, h_{czt}, l) = \quad (29)$$
$$\frac{1}{M} \sum_{k_r=0}^{M_{fft}-1} F_{V \cdot Ex}(n_{Tx}, n_{Rx}, h_{czt}, k_r) \exp\left(j2\pi \frac{m_{fft}}{M_{fft}} k_r\right)$$

$(l = 0, 1, \ldots, M_{fft} - 1)$ $(h_{czt} = 0, 1, \ldots, H_{czt} - 1)$ $(n_{Tx} = 1, 2, \ldots, N_{Tx})$ $(n_{Rx} = 1, 2, \ldots, N_{Rx})$ The integrating unit 233-1 performs integration on the signals $R_{PC}(n_{Tx}, n_{Rx}, h_{czt}, l)$ based on a velocity and a range after correlation, the signals being acquired from the correlation unit 232-1 and being separated for each of the transmission frequencies, in accordance with Equation (30), to generate a band-synthesized signal $R_{\Sigma Tx}(n_\theta, n_{Rx}, h_{czt}, l)$ based on a velocity and a range after correlation. Here, $\theta'(n_\theta)$ denotes arrival angle candidate, $n_\theta$ denotes arrival angle candidate number, and $N_\theta$ denotes the number of arrival angle candidates. When $\theta=\theta'(n_\theta)$, the signals $R_{PC}(n_{Tx}, n_{Rx}, h_{czt}, l)$ based on a velocity and a range after correlation, the signals being separated for each of the transmission frequencies, are integrated coherently, and the band-synthesized signal $R_{\Sigma Tx}(n_\theta, n_{Rx}, h_{czt}, l)$ based on a velocity and a range after correlation exhibits a maximum.

$$R_{\Sigma Tx}(n_\theta, n_{Rx}, h_{czt}, l) = \quad (30)$$
$$\sum_{n_{Tx}=1}^{N_{Tx}} R_{PC}(n_{Tx}, n_{Rx}, h_{czt}, l) \exp$$
$$\left(j2\pi(f_0 + B_{n_{Tx}}) \frac{d_{Tx}(n_{Tx}) \sin\theta'(n_\theta)}{c}\right)$$

$(n_\theta = 0, 1, \ldots, N_\theta - 1)$ $(l = 0, 1, \ldots, M_{fft} - 1)$

-continued $(h_{czt} = 0, 1, \ldots, H_{czt} - 1)$ $(n_{Rx} = 0, 1, \ldots, N_{Rx} - 1)$ The integrating unit 233-1 outputs the band-synthesized signal $R_{\Sigma Tx}(n_\theta, n_{Rx}, h_{czt}, l)$ based on a velocity and a range after correlation to the target candidate detecting unit 241 in the second signal processor 240. The target candidate detecting unit 241 performs detection of a target candidate on the band-synthesized signal $R_{\Sigma Tx}(n_\theta, n_{Rx}, h_{czt}, l)$ based on a velocity and a range after correlation, the band-synthesized signal being acquired from the integrating unit 233-1, on the basis of a signal strength. More concretely, for example, a Cell Average Constant False Alarm Rate (CA-CFAR) process can be considered. The target candidate detecting unit 241 outputs the band-synthesized signal $R_{\Sigma Tx}(n_\theta, n_{Rx}, h_{czt}, l)$ based on a velocity and a range after correlation, the arrival angle candidate number $n_\theta'$ and the velocity bin number $h_{czt}'$ of a target candidate which has been detected, and the sampling number $l'$ in a range direction to the target's relative-velocity/relative-range/arrival-angle calculating unit 242.

On the basis of the arrival angle candidate number $n_\theta'$ and the velocity bin number $h_{czt}'$ of the target candidate, and the sampling number $l'$ in the range direction, which are acquired, the target's relative-velocity/relative-range/arrival-angle calculating unit 242 calculates a target candidate relative velocity $v'_{tgt}$ in accordance with Equation (31) and also calculates a target candidate relative range $R'_{tgt}$ in accordance with Equation (32). Here, $\Delta r_{IFFT}$ denotes the length of each of sampling intervals in the range direction after correlation. The target's relative-velocity/relative-range/arrival-angle calculating unit 242 outputs the target candidate arrival angle $\theta'(n_\theta')$ corresponding to the arrival angle candidate number $n_\theta'$, the target candidate relative velocity $v'_{tgt}$, and the target candidate relative range $R'_{tgt}$ to the display 250.

$$v'_{tgt} = v_{czt}(h_{czt}') \quad (31)$$

$$R'_{tgt} = l' \Delta r_{IFFT} \quad (32)$$

The display 250 displays, as signal processing results, the target candidate arrival angle $\theta'(n_\theta')$, the target candidate relative velocity $v'_{tgt}$, and the target candidate relative range $R'_{tgt}$ which are provided as pieces of target information on the screen.

As explained above, in the radar system according to Embodiment 1, the multiple transmission radars transmit transmitted signals having different transmission frequencies, and, in the reception radar which receives transmitted signals reflected by a target, in order to coherently integrate reception video signals corresponding to the different transmission frequencies without the influence of the Doppler frequency, the frequency domain transforming unit 231-1 performs a transform into the frequency domain by performing a chirp z-transform while changing the Doppler frequency interval for each of the different transmission frequencies in such a way that the Doppler velocity bin is the same for each of the different transmission frequencies. This transforming process into the frequency domain can be a discrete Fourier transform, though the amount of arithmetic operation is large. Because the frequency domain transforming unit 231-1 performs the transform into the frequency domain in such a way that the Doppler velocity bin is the same for each of the different transmission frequencies, it is not necessary to detect and calculate a target relative velocity, and the target detection performance of a radar system with low Signal to Noise Ratio (SNR) can be improved.

The correlation unit 232-1 performs processes of determining correlations between the reference signal $Ex(n_{Tx}, h_{czt}, m)$ based on both each transmission frequency and the velocity corresponding to each velocity bin, and the signals $F_{CZT}(n_{Tx}, n_{Rx}, h_{czt}, m)$ based on a velocity and a range, i.e., pulse compression, to generate signals $R_{PC}(n_{Tx}, n_{Rx}, h_{czt}, l)$ based on a velocity and a range after correlation, the signals being separated for each of the transmission frequencies. Because the correlation unit 232-1 performs the pulse compression by using the reference signal $Ex(n_{Tx}, h_{czt}, m)$ based on both each transmission frequency and the velocity corresponding to each velocity bin, it is possible to perform the pulse compression without the influence of the Doppler frequency. As a result, each reception video signal is pulse-compressed to a target relative range, and the range measurement performance is improved. Further, the radar system can suppress an increase in an unnecessary peak also for a received signal having a Doppler frequency.

The integrating unit 233-1 performs integration on the signals $R_{PC}(n_{Tx}, n_{Rx}, h_{czt}, l)$ based on a velocity and a range after correlation which are inputted thereto from the correlation unit 232-1, the signals being separated for each of the transmission frequencies, to generate a band-synthesized signal $R_{\Sigma Tx}(n_\theta, n_{Rx}, h_{czt}, l)$ based on a velocity and a range after correlation. Although the reception video signals corresponding to the different transmission frequencies are integrated, there is a problem that when the transmission frequencies differ, the Doppler frequencies also differ and, as a result, the reception video signals corresponding to the different transmission frequencies differ in phase and are not coherent, and an integration loss occurs. Because the correlation unit 232-1 uses the reference signal $Ex(n_{Tx}, h_{czt}, m)$ based on both each transmission frequency and the velocity corresponding to each velocity bin, against this problem, the reception video signals are coherent, and the integration can be performed without an integration loss. Therefore, the power is increased after the integration, and the detection performance of the radar system can be improved.

As previously explained, because the radar system according to Embodiment 1 includes: multiple transmission radars for emitting transmission signals with different frequencies, each frequency being generated using a pulse signal and an intrapulse modulation signal used for performing frequency modulation on the pulse signal; a receiving unit for converting received signals of the transmission signals that return from a target on reflection, into a reception video signal; a frequency domain transforming unit for transforming the reception video signal into signals based on a velocity and a range in such a way that Doppler frequencies of the target belongs to a same velocity bin number regardless of a change in the frequencies of the transmission signals; a correlation unit for performing correlation process on output signals from the frequency domain transforming unit by using reference signals associated with both a transmission frequency of the multiple transmission radars and a velocity corresponding to a velocity bin number, to generate signals based on a velocity and a range after correlation, the signals being separate for each of the transmission frequencies of the multiple transmission radars; an integrating unit for integrating output signals from the correlation unit using target arrival angle candidates, to generate band-synthesized signals based on a velocity and a range after correlation; a target candidate detecting unit for performing detection of a target candidate on output signals from the integrating unit on a basis of signal strength; and a target's relative-velocity/relative-range/arrival-angle calculating unit for calculating a relative velocity, a relative range, and an arrival angle of the target candidate, the target detection performance can be improved even in a case in which there is an influence of the Doppler frequency of the target.

Further, because in the radar system according to Embodiment 1, the multiple transmission radars are configured so as to emit the transmitted signals with different frequencies for which intrapulse frequency modulation is performed upwardly or downwardly, keeping a preset frequency spacing, the transmission of the signals with different transmission frequencies can be performed with the simple configuration.

In addition, because in the radar system according to Embodiment 1, the frequency domain transforming unit is configured so as to perform the transforming process by additionally performing a window function process on the reception video signal, a sidelobe in the velocity direction of each signal after transform into the frequency domain can be reduced, and the target can be prevented from being buried in a sidelobe.

Further, because in the radar system according to Embodiment 1, the frequency domain transforming unit is configured so as to use a discrete Fourier transform to sample reception video signals obtained after frequency domain transform at intervals that are determined based on a center transmission frequency, the target detection performance of the radar system can be improved.

In addition, because in the radar system according to Embodiment 1, the frequency domain transforming unit is configured so as to use a chirp z-transform to sample reception video signals obtained after frequency domain transform at intervals that are determined based on a center transmission frequency, while the target detection performance of the radar system can be improved, the processing can be performed with a smaller amount of arithmetic operation.

Further, because in the radar system according to Embodiment 1, the correlation unit is configured so as to use the reference signals to each of which a phase based on the target displacement distance during the observation time is added, the pulse compression can be performed without the influence of the Doppler frequency.

Embodiment 2

Figure 19:
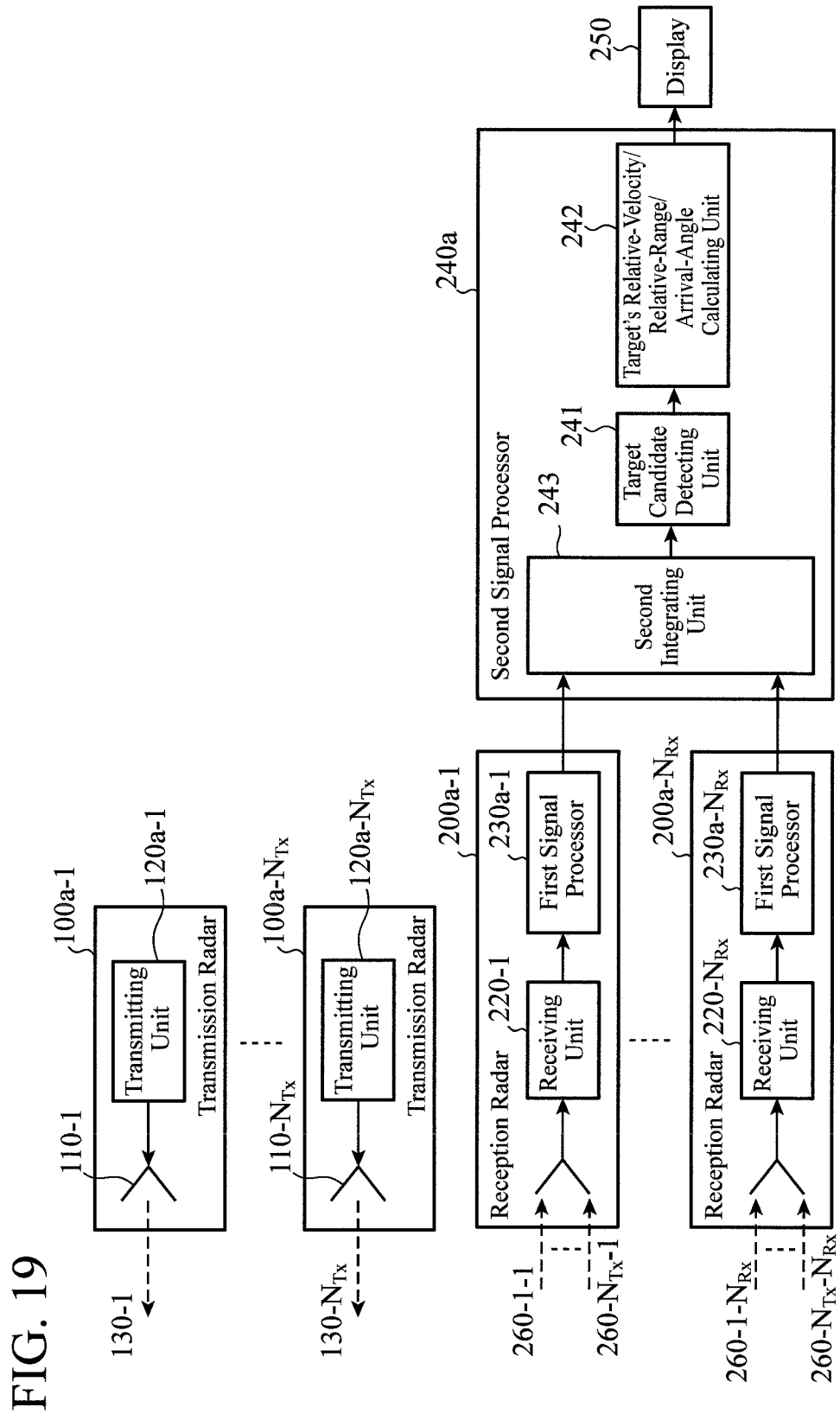
FIG. 19 is a block diagram a radar system according to Embodiment 2 of the present disclosure.

A radar system according to Embodiment 2 includes transmission radars $100a$-$n_{Tx}$ ($n_{Tx}$ is transmission radar number; $n_{Tx}$=1, 2, . . . , $N_{Tx}$ in a case in which the number of transmission radars is $N_{Tx}$), reception radars $200a$-$n_{Rx}$ ($n_{Rx}$ is reception radar number; $n_{Rx}$=1, 2, . . . , $N_{Rx}$ in a case in which the number of reception radars is $N_{Rx}$; a configuration in the case of $N_{Rx}$=two or more will be explained in Embodiment 2), a second signal processor $240a$, and a display $250$, as shown in FIG. 19.

Figure 20:
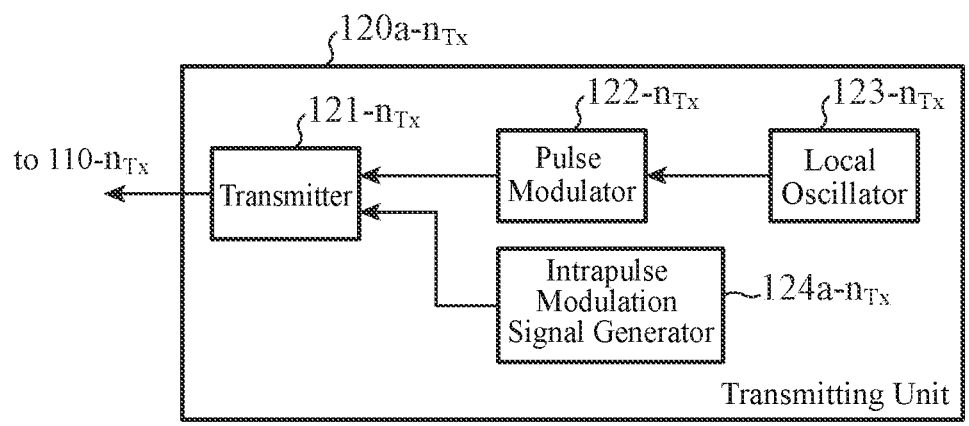
FIG. 20 is a block diagram of each transmitting unit of the radar system according to Embodiment 2 of the present disclosure.

The radar system according to Embodiment 2 differs from that according to Embodiment 1 in the configuration of a transmitting unit $120a$-$n_{Tx}$ of each transmission radar $100a$-$n_{Tx}$, the configuration of a first signal processor $230a$-$n_{Rx}$ of each reception radar $200a$-$n_{Rx}$, and the configuration of the second signal processor $240a$. Because the other components are the same as those according to Embodiment 1, the corresponding components are denoted by the same reference character strings and the explanation of the components will be omitted hereafter. FIG. 20 is a block diagram of each transmitting unit $120a$-$n_{Tx}$. As shown in the figure, each transmitting unit $120a$-$n_{Tx}$ includes a transmitter $121$-$n_{Tx}$, a pulse modulator $122$-$n_{Tx}$, a local oscillator $123$-$n_{Tx}$, and an intrapulse modulation signal generator $124a$-$n_{Tx}$, and the components other than the intrapulse modulation signal generator $124a$-$n_{Tx}$ are same as those according to Embodiment 1.

Figure 21:
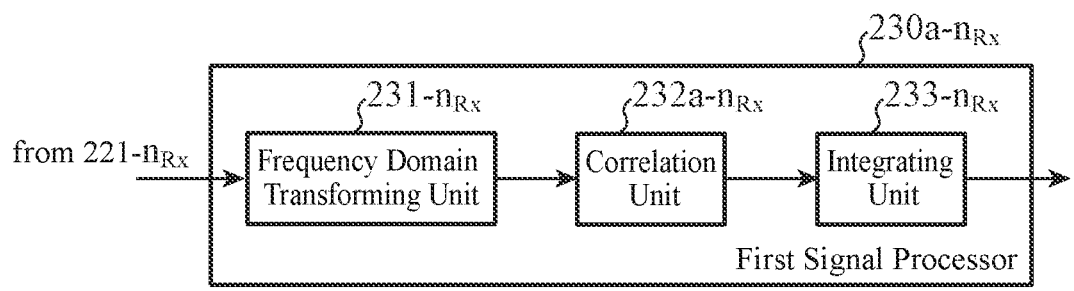
FIG. 21 is a block diagram of a first signal processing unit of the radar system according to Embodiment 2 of the present disclosure.

FIG. 21 is a block diagram of each first signal processor $230a$-$n_{Rx}$. As shown in the figure, each first signal processor $230a$-$n_{Rx}$ includes a frequency domain transforming unit $231$-$n_{Rx}$, a correlation unit $232a$-$n_{Rx}$, and an integrating unit $233$-$n_{Rx}$, and the components other than the correlation unit $232a$-$n_{Rx}$ are same as those according to Embodiment 1.

The second signal processor $240a$ differs from that according to Embodiment 1 in that the second signal processor $240a$ includes a second integrating unit $243$.

The intrapulse modulation signal generator $124a$-$n_{Tx}$ of each transmitting unit $120a$-$n_{Tx}$ generates an intrapulse modulation signal $L_{chp}(n_{Tx}, t)$ used for performing frequency modulation on a pulse signal by using an amount of frequency modulation $B_{nTx}$ and a modulation bandwidth $\Delta B_{nTx}$ in such a way that the frequency modulation in a frequency band and that in another frequency band adjacent to the frequency band are complex conjugates of each other, in accordance with Equation (33), and outputs the intrapulse modulation signal to the transmitter $121$-$n_{Tx}$. Here, ± shows that when $n_{Tx}$ is an odd number, the negative sign is used (more specifically, the frequency modulation is down-chirp one), and when $n_{Tx}$ is an even number, the positive sign is used (more specifically, the frequency modulation is up-chirp one).

Figure 22:
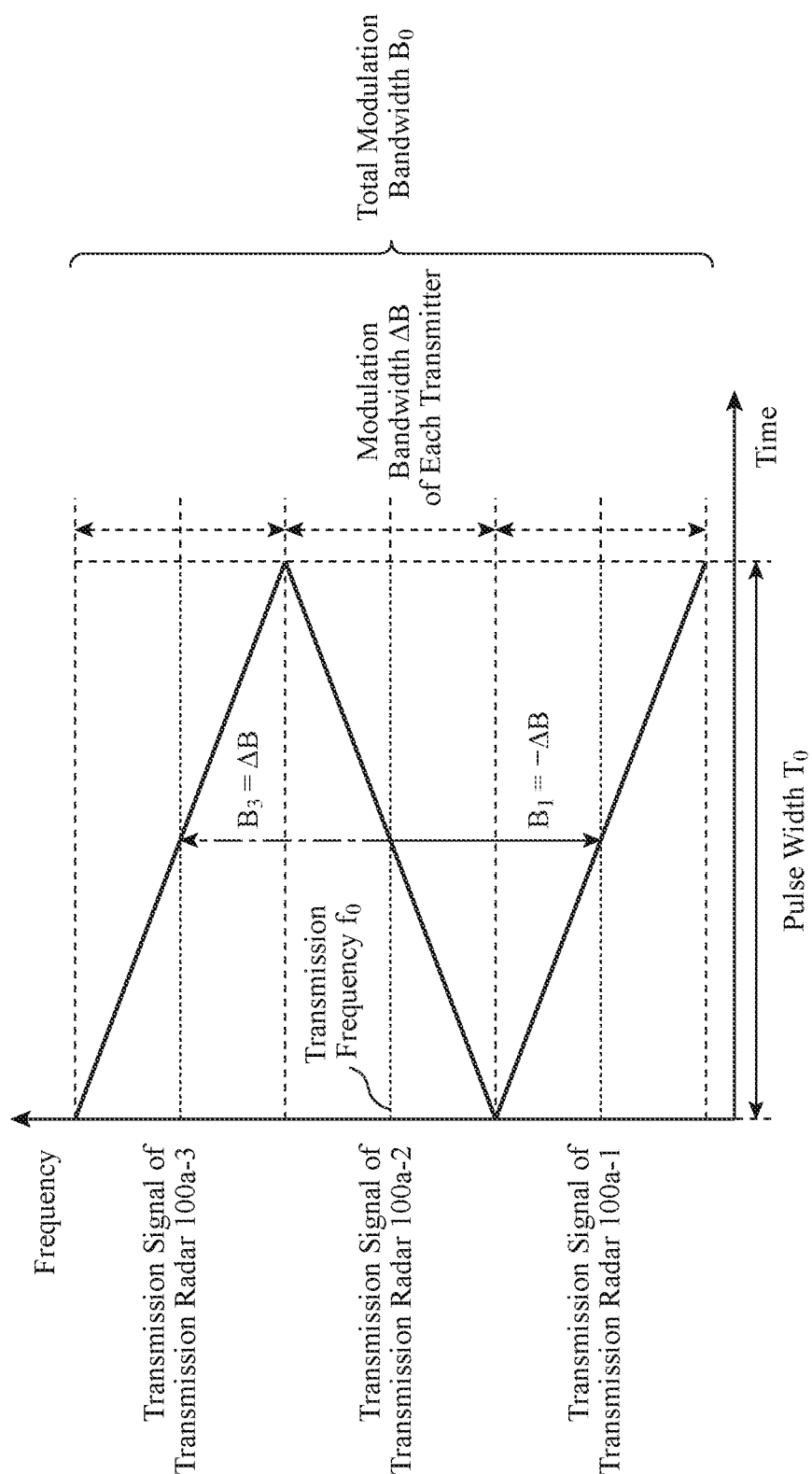
FIG. 22 is an explanatory illustration showing a relationship among the transmission frequencies, the modulation bandwidths, and the frequency modulation of transmission radars of the radar system according to Embodiment 2 of the present disclosure.

A relationship among the amount of frequency modulation $B_{nTx}$, the modulation bandwidth $\Delta B_{nTx}$, and frequency modulation for each transmission radar is shown in FIG. 22. An amount of frequency modulation $B_2$ is 0.

$$L_{chp}(n_{Tx}, h, t) = \begin{cases} A_L \exp\left(j2\pi\left(B_{nTx}t \pm \frac{\Delta B_{nTx}}{2T_0}t^2\right)\right), \\ hT_{pri} \leq t < hT_{pri} + T_0 \\ 0, \quad \text{otherwise} \end{cases} \quad (33)$$

$(h = 0, 1, \ldots, H-1)$ $(n_{Tx} = 1, 2, \ldots, N_{Tx})$

The correlation unit $232a$-$n_{Rx}$ generates a reference signal $Ex(n_{Tx}, h_{czt}, m)$ including, in addition to the amount of frequency modulation $B_{nTx}$ and the modulation bandwidth $\Delta B_{nTx}$ of each transmission radar $100a$-$n_{Tx}$ which are the same as those for the intrapulse modulation signal $L_{chp}(n_{Tx}, t)$, the Doppler frequency corresponding to the velocity in each velocity bin, in accordance with Equation (34). Further, in order to prevent a phase based on the movement range of a target in H hits during an observation time period from exerting an influence different for each transmission frequency, a reference signal $Ex(n_{Tx}, h_{czt}, m)$ also including the phase (third term in Equation (35)) based on the target displacement distance in H hits can be generated in accordance with Equation (35). The sign ± in each of Equations (34) and (35) shows that when $n_{Tx}$ is an odd number the negative sign is used (more specifically, the frequency modulation is down-chirp one), and when $n_{Tx}$ is an even number the positive sign is used (more specifically, the frequency modulation is up-chirp one). Because the details of subsequent pulse compression processing are the same as those of the correlation unit 232-1 according to Embodiment 1, an explanation of the processing will be omitted hereafter.

$$Ex(n_{Tx}, h_{czt}, m) = \begin{cases} A_E \exp\left(j2\pi(B_{n_{Tx}}m\Delta t \pm \frac{\Delta B_{n_{Tx}}}{2T_0}m^2\Delta t^2)\right) \\ \exp(j2\pi(f_0 + B_{n_{Tx}}) \\ \frac{2v_{czt}(h_{czt})}{c}m\Delta t\Big), \\ 0 \le m\Delta t \le T_0 \\ 0, \qquad \text{otherwise} \end{cases} \qquad (34)$$

$(m = 0, 1, \ldots, M)$
$(h_{czt} = 0, 1, \ldots, H_{czt} - 1)$
$(n_{Tx} = 1, 2, \ldots, N_{Tx})$ $$Ex(n_{Tx}, h_{czt}, m) = \begin{cases} A_E \exp\left(j2\pi(B_{n_{Tx}}m\Delta t \pm \frac{\Delta B_{n_{Tx}}}{2T_0}m^2\Delta t^2)\right) \\ \exp(j2\pi(f_0 + B_{n_{Tx}}) \\ \frac{2v_{czt}(h_{czt})}{c}m\Delta t\Big) \\ \exp(-j2\pi(f_0 + B_{n_{Tx}}) \\ \frac{2v_{czt}(h_{czt})}{c}\frac{T_{pri}H}{2}\Big), \\ 0 \le m\Delta t \le T_0 \\ 0, \qquad \text{otherwise} \end{cases} \qquad (35)$$

Figure 23:
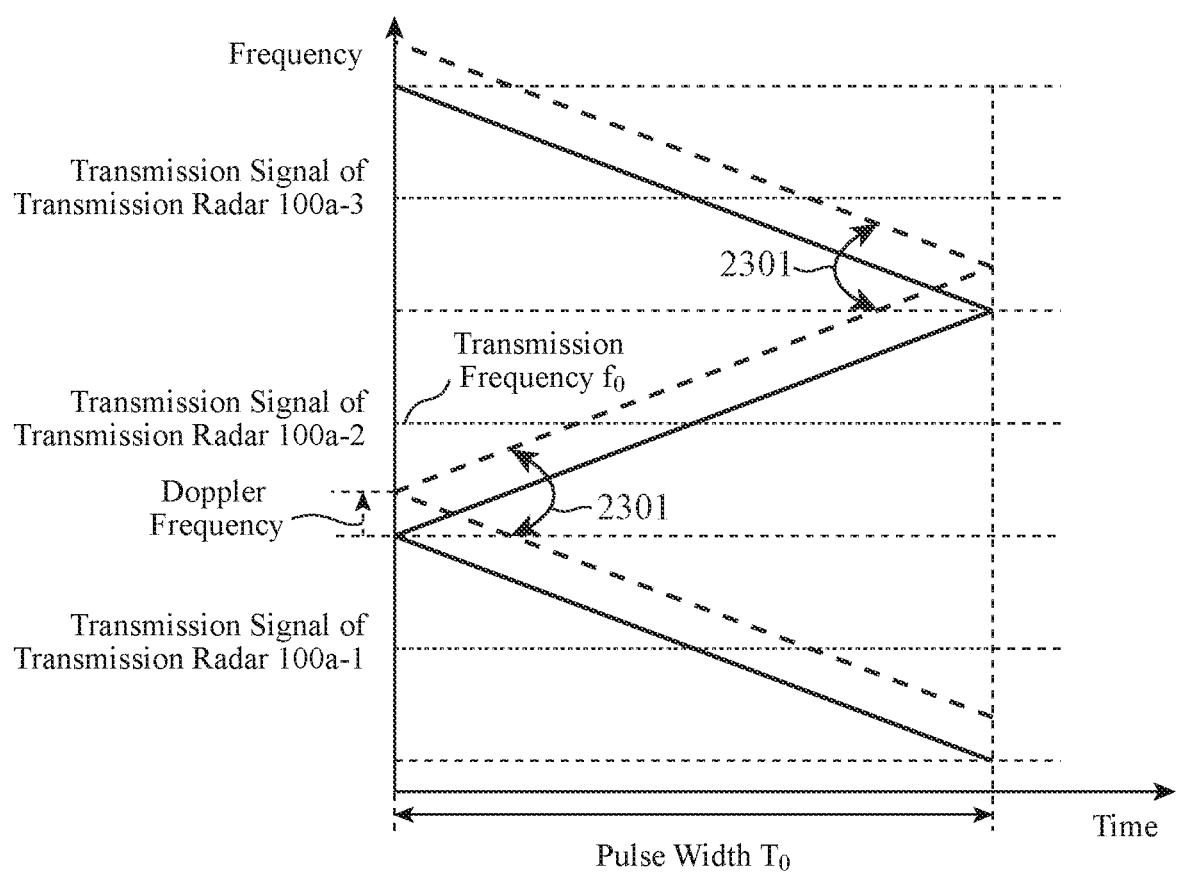
FIG. 23 is an explanatory illustration showing the transmitted signals and received signals which are under the influence of a Doppler frequency in Embodiment 2 of the present disclosure.
Figure 24A:
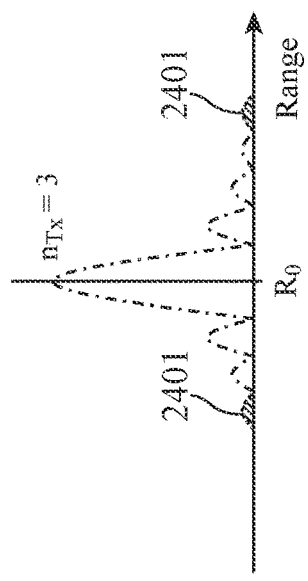
FIGS. 24A, 24B, and 24C are explanatory illustrations showing the influence of a Doppler frequency when pulse compression is performed in a case in which the frequency modulation in a frequency band and that in another frequency band adjacent to the frequency band are complex conjugates of each other.
Figure 24B:
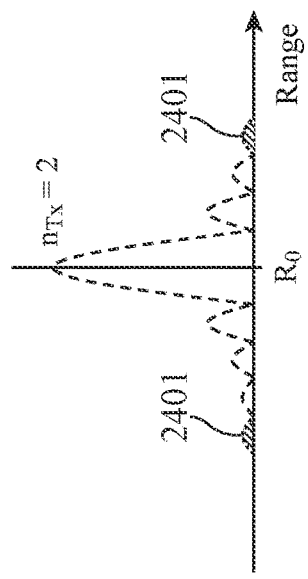
Figure 24C:
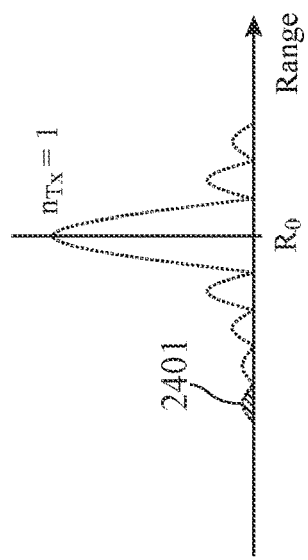
Figure 25:
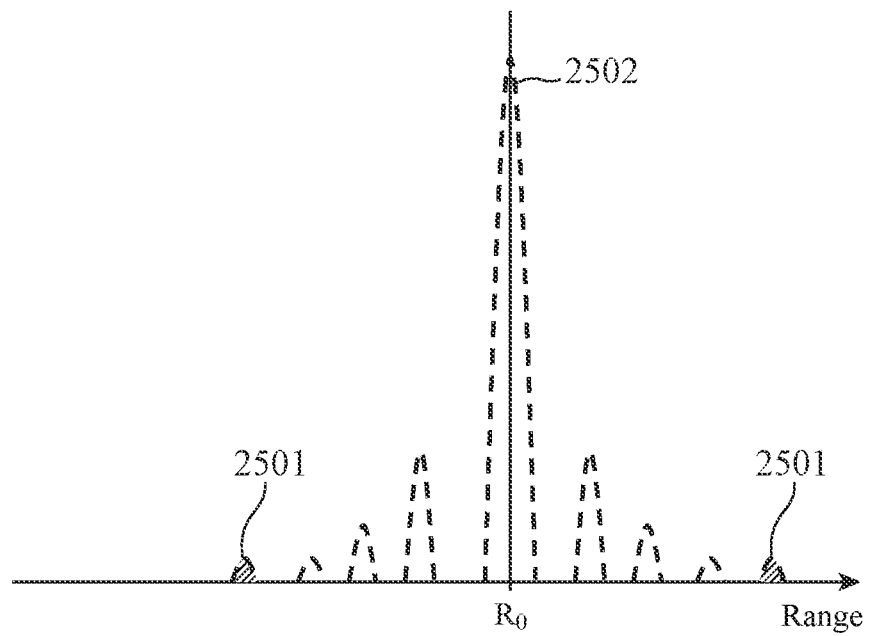
FIG. 25 is an explanatory illustration showing the influence of a Doppler frequency when band synthesis is performed on signals after correlation corresponding to the transmission frequencies in the case in which the frequency modulation in a frequency band and that in another frequency band adjacent to the frequency band are complex conjugates of each other.

$(m = 0, 1, \ldots, M)$
$(h_{czt} = 0, 1, \ldots, H_{czt} - 1)$
$(n_{Tx} = 1, 2, \ldots, N_{Tx})$ Advantages which are provided in a case in which each transmission radar $100a$-$n_{Tx}$ transmits a transmission signal such that frequency modulations in the adjacent frequency bands are complex conjugate, as shown in FIG. 22, and each correlation unit $232a$-$n_{Rx}$ performs pulse compression will be explained. A received signal in a case in which a Doppler frequency is included is shown in FIG. 23. In FIG. 23, the transmitted signal of each transmission radar $100a$-$n_{Tx}$ is shown with a solid line, and a received signal having an influence of the Doppler frequency is shown with a broken line. Because the transmitted signal of each transmission radar $100a$-$n_{Tx}$ is generated in such a way that the frequency modulation in the frequency band and that in another frequency band adjacent to the frequency band are complex conjugates, there is provided an advantage that cross correlations cancel each other out when the pulse compression is performed (refer to arrows 2301), and unnecessary peaks do not occur and sidelobes do not rise (refer to sections 2401), as shown in FIG. 24. FIG. 24A shows a signal for the transmission radar 100a-1 after correlation, FIG. 24B shows a signal for the transmission radar 100a-2 after correlation, and FIG. 24C shows a signal for the transmission radar 100a-3 after correlation. Further, also when band synthesis is performed by the integrating unit 233-$n_{Rx}$, there is no influence of cross correlations, sidelobes do not rise, and an integration result providing low sidelobes can be acquired (refer to sections 2501), as shown in FIG. 25. In addition, because the band synthesis is performed, there is provided an advantage of increasing the power and improving the range resolution (refer to a section 2502). More specifically, the detection performance of the radar system is improved.

Figure 26:
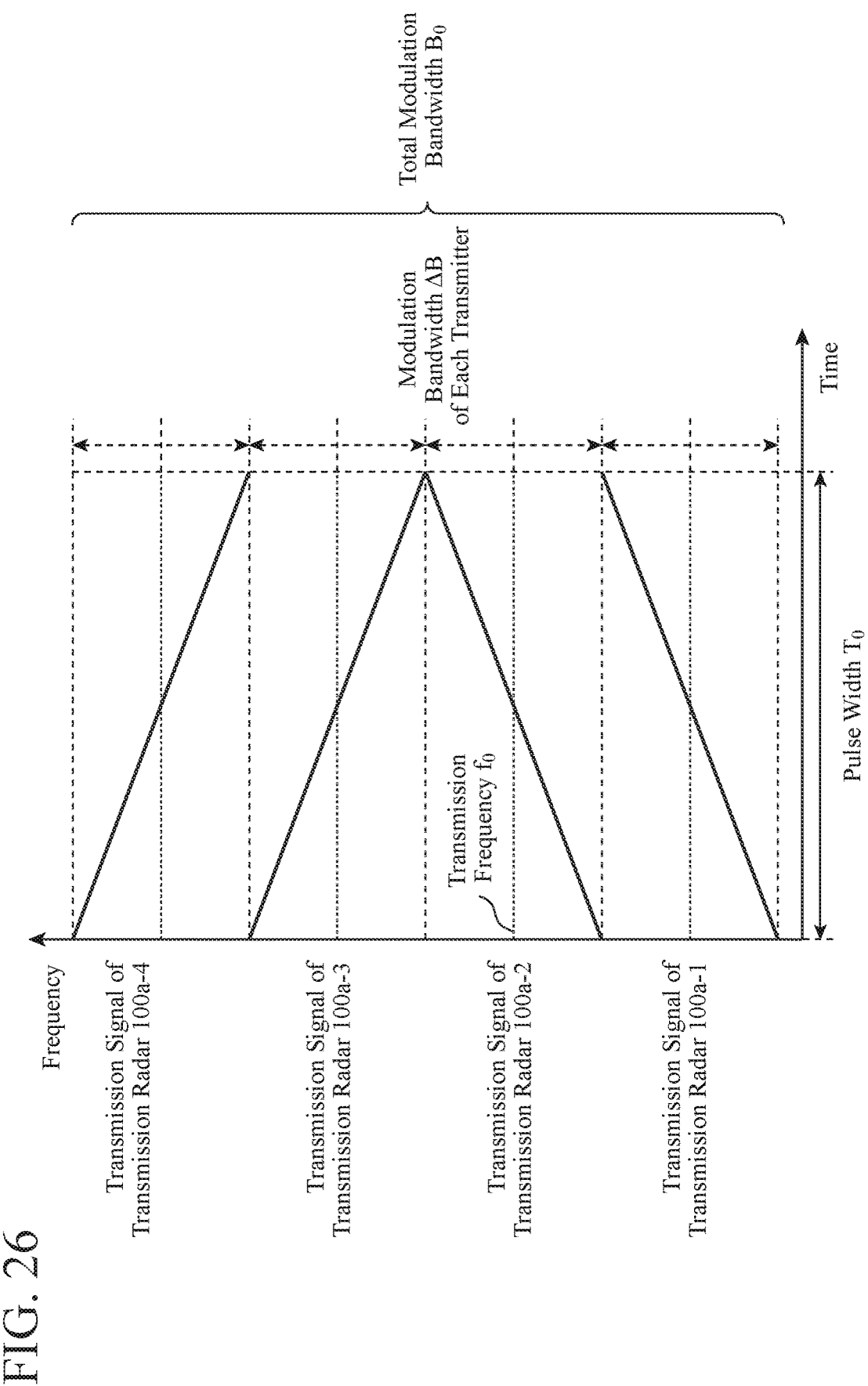
FIG. 26 is an explanatory illustration showing a variant of the relationship among the transmission frequencies, the modulation bandwidths, and the frequency modulation of the transmission radars of the radar system according to Embodiment 2 of the present disclosure.

Further, frequency modulations in symmetric frequency bands can be made to be complex conjugates, as shown in FIG. 26. In the example shown in the figure, the transmitted signal of the transmission radar 100a-1 and the transmitted signal of the transmission radar 100a-4 are complex conjugates with each other, and the transmitted signal of the transmission radar 100a-2 and the transmitted signal of the transmission radar 100a-3 are complex conjugates with each other. Also in this configuration, the same advantage as that in the case in which the transmitted signals in which the frequency modulation in the frequency band and that in another frequency band adjacent to the frequency band are complex conjugates of each other are transmitted can be provided.

The second integrating unit 243 receives band-synthesized signals $R_{\Sigma Tx}(n_\theta, n_{Rx}, h_{czt}, l)$ based on a velocity and a range after correlation from the first signal processors 230-1 to 230-$N_{Rx}$. The second integrating unit 243 performs integration on the band-synthesized signals $R_{\Sigma Tx}(n_\theta, n_{Rx}, h_{czt}, l)$ of the reception radars $200a$-$n_{Rx}$, the band-synthesized signals being based on a velocity and a range after correlation, in accordance with Equation (36), to generate an integrated signal $R_{\Sigma Tx,Rx}(n_\theta, h_{czt}, l)$ based on a velocity and a range after correlation. When $\theta = \theta'(n_\theta)$, the band-synthesized signals $R_{\Sigma Tx}(n_\theta, n_{Rx}, h_{czt}, l)$ of the reception radars $200a$-$n_{Rx}$, the band-synthesized signals being based on a velocity and a range after correlation, are integrated coherently, and the integrated signal $R_{\Sigma Tx,Rx}(n_\theta, h_{czt}, l)$ based on a velocity and a range after correlation exhibits a maximum. By integrating the signals of the reception radars $200a$-$n_{Rx}$, the power can be increased and the detection performance of the radar system can be improved. Because the antenna aperture length is increased virtually by integrating the signals of the reception radars $200a$-$n_{Rx}$, there is provided an advantage of improving the angular resolution.

$$R_{\Sigma Tx,Rx}(n_\theta, h_{czt}, l) = \qquad (36)$$

$$\sum_{n_{Rx}=1}^{N_{Rx}} R_{\Sigma Tx}(n_\theta, n_{Rx}, h_{czt}, l) \exp$$

$$\left( j2\pi(f_0 + B_{n_{Tx}}) \frac{d_{Rx}(n_{Rx}) \sin \theta'(n_0)}{c} \right)$$

$(n_\theta = 0, 1, \ldots, N_\theta - 1)$
$(l = 0, 1, \ldots, M_{\mathit{ff}t} - 1)$
$(h_{czt} = 0, 1, \ldots, H_{czt} - 1)$
$(n_{Rx} = 0, 1, \ldots, N_{Rx} - 1)$ The second integrating unit 243 outputs the integrated signal $R_{\Sigma Tx,Rx}(n_\theta, h_{czt}, l)$ based on a velocity and a range after correlation to a target candidate detecting unit 241. The operations of the target candidate detecting unit 241 and the following units are the same as those according to Embodiment 1.

As explained above, because in the radar system according to Embodiment 2, the transmitted signal from each transmission radar $100a$-$n_{Tx}$ is generated in such a way that the frequency modulation in the frequency band and that in another frequency band adjacent to the frequency band are complex conjugates of each other, there is provided an advantage that cross correlations cancel each other out when the pulse compression is performed, and unnecessary peaks do not occur and sidelobes do not rise. Further, also when band synthesis is performed by the integrating unit 233-$n_{Rx}$, there is no influence of cross correlations, sidelobes do not rise, and an integration result providing low sidelobes can be acquired. More specifically, the detection performance of the radar system can be improved.

Further, because the second integrating unit 243 integrates the signals of the reception radars 200a-$n_{Rx}$, the power can be increased and the detection performance of the radar system can be improved. In addition, because the antenna aperture length is increased virtually by integrating the signals of the reception radars 200a-$n_{Rx}$, there is provided an advantage of improving the angular resolution.

As previously explained, because the radar system according to Embodiment 2 includes the second integrating unit for integrating band-synthesized signals based on a velocity and a range after correlation using target arrival angle candidates, to generate integrated signals based on a velocity and a range after correlation, and wherein the target candidate detecting unit performs detection of a target candidate on, instead of the output signal of the integrating unit, output signals from the second integrating unit, while the power can be increased and the detection performance can be improved, the angular resolution can be improved.

Further, because in the radar system according to Embodiment 2, the multiple transmission radars are configured so as to emit the transmission signals with the different frequencies for which intrapulse frequency modulation is performed upwardly or downwardly in such a manner that frequency modulations in adjacent frequency bands are complex conjugates, keeping a preset frequency spacing, cross correlations cancel each other out when the pulse compression is performed, and unnecessary peaks do not occur and sidelobes do not rise. As a result, the detection performance of the radar system can be improved.

Further, because in the radar system according to Embodiment 2, the multiple transmission radars are configured so as to emit the transmitted signals with the different frequencies for which intrapulse frequency modulation is performed upwardly or downwardly in such a manner that frequency modulations in symmetric frequency bands are complex conjugates, keeping a preset frequency spacing, cross correlations cancel each other out when the pulse compression is performed, and unnecessary peaks do not occur and sidelobes do not rise. As a result, the detection performance of the radar system can be improved.

Embodiment 3

Figure 27:
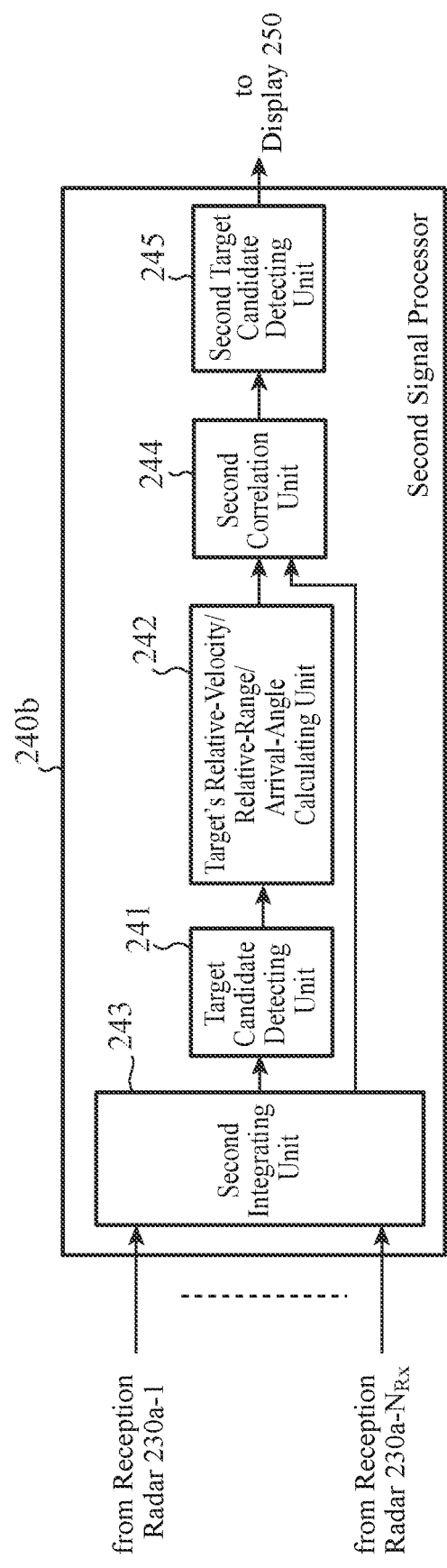
FIG. 27 is a block diagram of a second signal processor in a radar system according to Embodiment 3 of the present disclosure.

A radar system according to Embodiment 3 is one in which the second signal processor 240a in the radar system according to Embodiment 2 is replaced by a second signal processor 240b, and the configuration of this second signal processor 240b is shown in FIG. 27. Because the configuration of each transmission radar 100a-$n_{Tx}$ and the configuration of each reception radar 200a-$n_{Rx}$ in the radar system according to Embodiment 3 are the same as those according to Embodiment 2 shown in FIG. 19, an explanation of these configurations will be made using FIG. 19.

Figure 28:
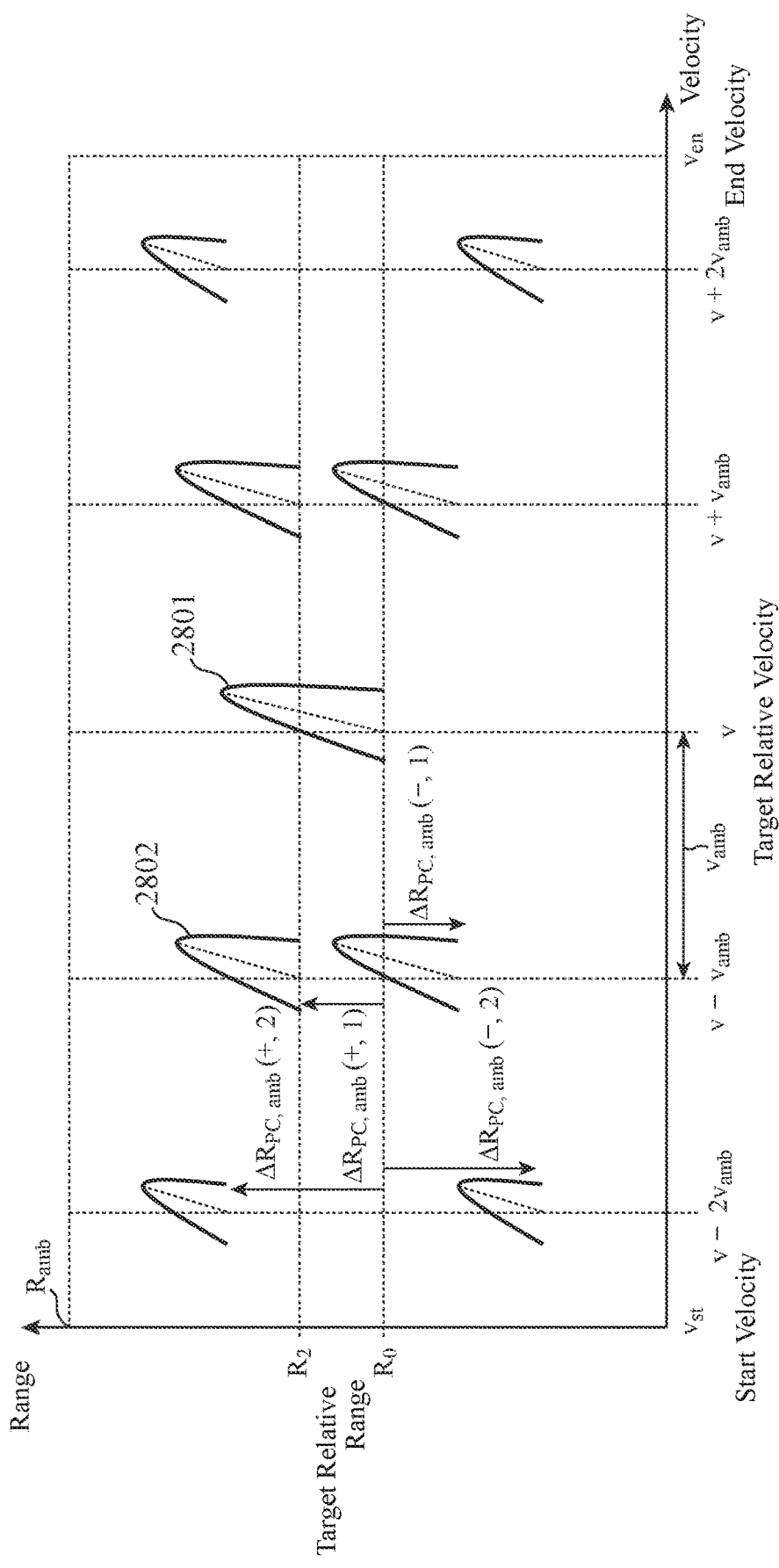
FIG. 28 is an explanatory illustration showing an integrated signal based on a velocity and a range after correlation in a case in which there is ambiguity in velocities, in Embodiment 3 of the present disclosure.

As shown in FIG. 27, the second signal processor 240b according to Embodiment 3 includes a second integrating unit 243, a target candidate detecting unit 241, a target's relative-velocity/relative-range/arrival-angle calculating unit 242, a second correlation unit 244, and a second target candidate detecting unit 245. Here, the configurations and the operations of the second integrating unit 243, the target candidate detecting unit 241, and the target's relative-velocity/relative-range/arrival-angle calculating unit 242 are the same as those according to Embodiment 2. An integrated signal $R_{\Sigma Tx,Rx}(n_\theta, h_{czt}, l)$ based on a velocity and a range after correlation, and a relative velocity, a relative range, and an arrival angle of a target candidate are inputted to the second correlation unit 244. FIG. 28 shows an integrated signal based on a velocity and a range after correlation in a case in which there is ambiguity in velocities. A range value shown by a dotted line is a range $R_{amb}$ measurable without ambiguity. When a velocity $v_{amb}$ measurable without ambiguity, and a transform start velocity $v_{st}$ and a transform end velocity $v_{en}$ have a relationship expressed in Equation (37), virtual images occur at intervals of the velocity $v_{amb}$ measurable without ambiguity while being centered on a relative velocity v of a true target, as shown in FIG. 28. Further, the difference between the range of each virtual image and a relative range of the target is expressed by Equation (38). Here, $n_{amb}$ denotes the number of velocity folding.

$$v_{amb} = \frac{c}{2f_0 T_{pri}} < v_{en} - v_{st} \qquad (37)$$

$$\Delta R_{PC,amb}(\mp, n_{amb}) = \mp f_0 \frac{T_0}{\Delta B} n_{amb} v_{amb} \qquad (38)$$

Figure 29:
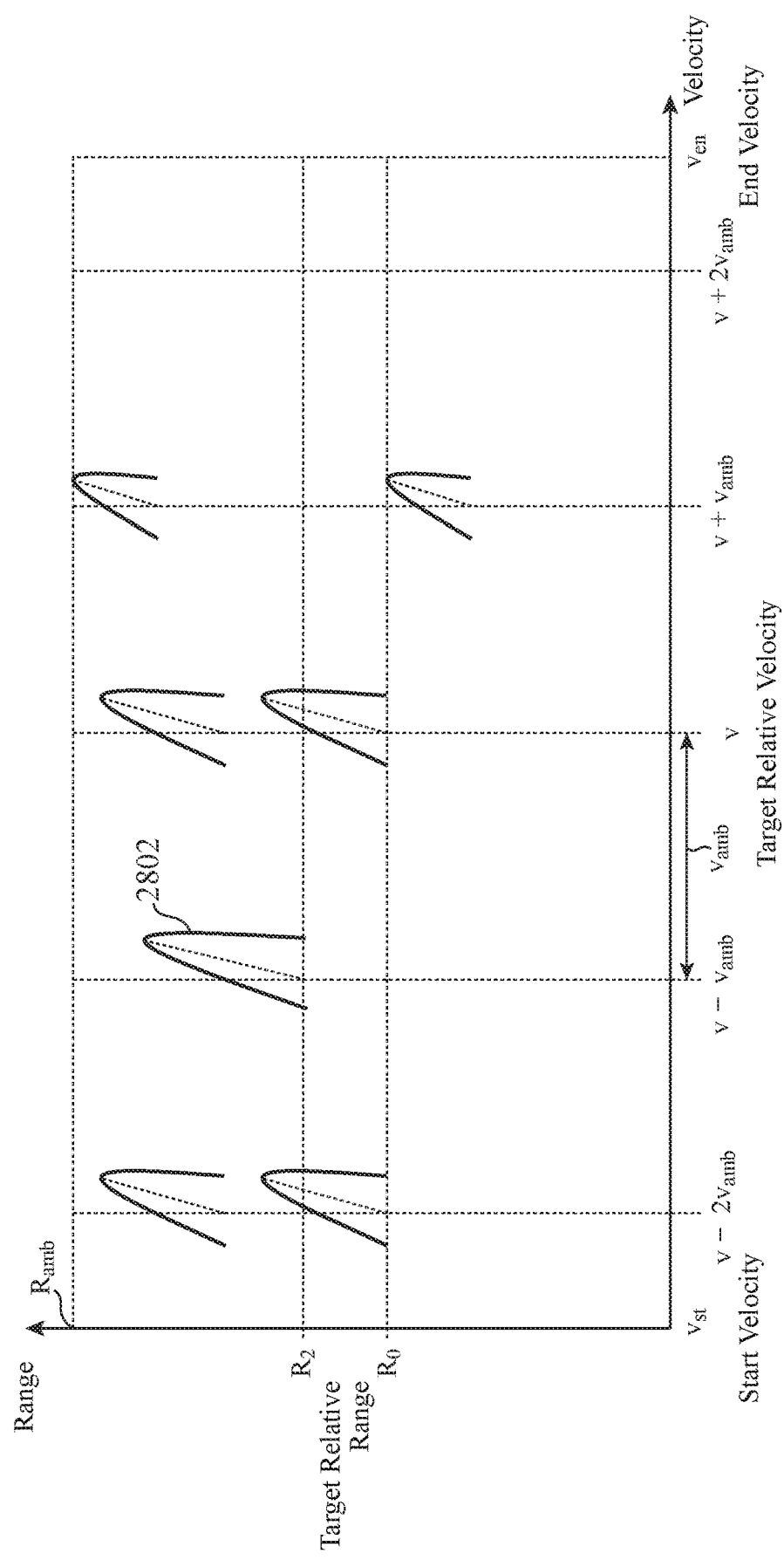
FIG. 29 is an explanatory illustration showing a two-dimensional reference signal for a second target candidate in Embodiment 3 of the present disclosure.

The second correlation unit 244 generates an integrated signal based on a velocity and a range after correlation on the basis of the relative velocity, the relative range, and the arrival angle of the target candidate, to define the integrated signal as a two-dimensional reference signal $Ex(n_t)$. For example, when a first target candidate 2801 is the true target, the two-dimensional reference signal $Ex(n_t)$ can be generated on the basis of the target relative velocity v, the relative range $R_0$, and the arrival angle of the first target candidate 2801, as shown in FIG. 28. Further, the two-dimensional reference signal $Ex(n_t)$ of a second target candidate 2802 can be generated on the basis of the target relative velocity $v-v_{amb}$, the relative range $R_2$, and the arrival angle of the second target candidate 2802, as shown in FIG. 29. Here, $n_t$ denotes a target candidate number.

The second correlation unit 244 performs a second correlation process of determining a correlation between the integrated signal $R_{\Sigma Tx,Rx}(n_\theta, h_{czt}, l)$ based on a velocity and a range after correlation, and each two-dimensional reference signal $Ex(n_t)$, in accordance with Equation (39), to generate a signal $R_2(n_t)$ after second correlation with each target candidate. Here, fft2(X) denotes a signal acquired after performing a two-dimensional FFT on a signal X, ifft2(X) denotes a signal acquired after performing a two-dimensional IFFT on the signal X, and Y* denotes a complex conjugate of a signal Y.

The second correlation unit 244 outputs the signal $R_2(n_t)$ after second correlation with each target candidate to the second target candidate detecting unit 245.

$$R_2(n_t) = \text{ifft2}(\text{fft2}(R_{\Sigma Tx,Rx}(n_\theta, h_{czt}, l))\text{fft2}(Ex(n_t))^*) \qquad (39)$$

Figure 30:
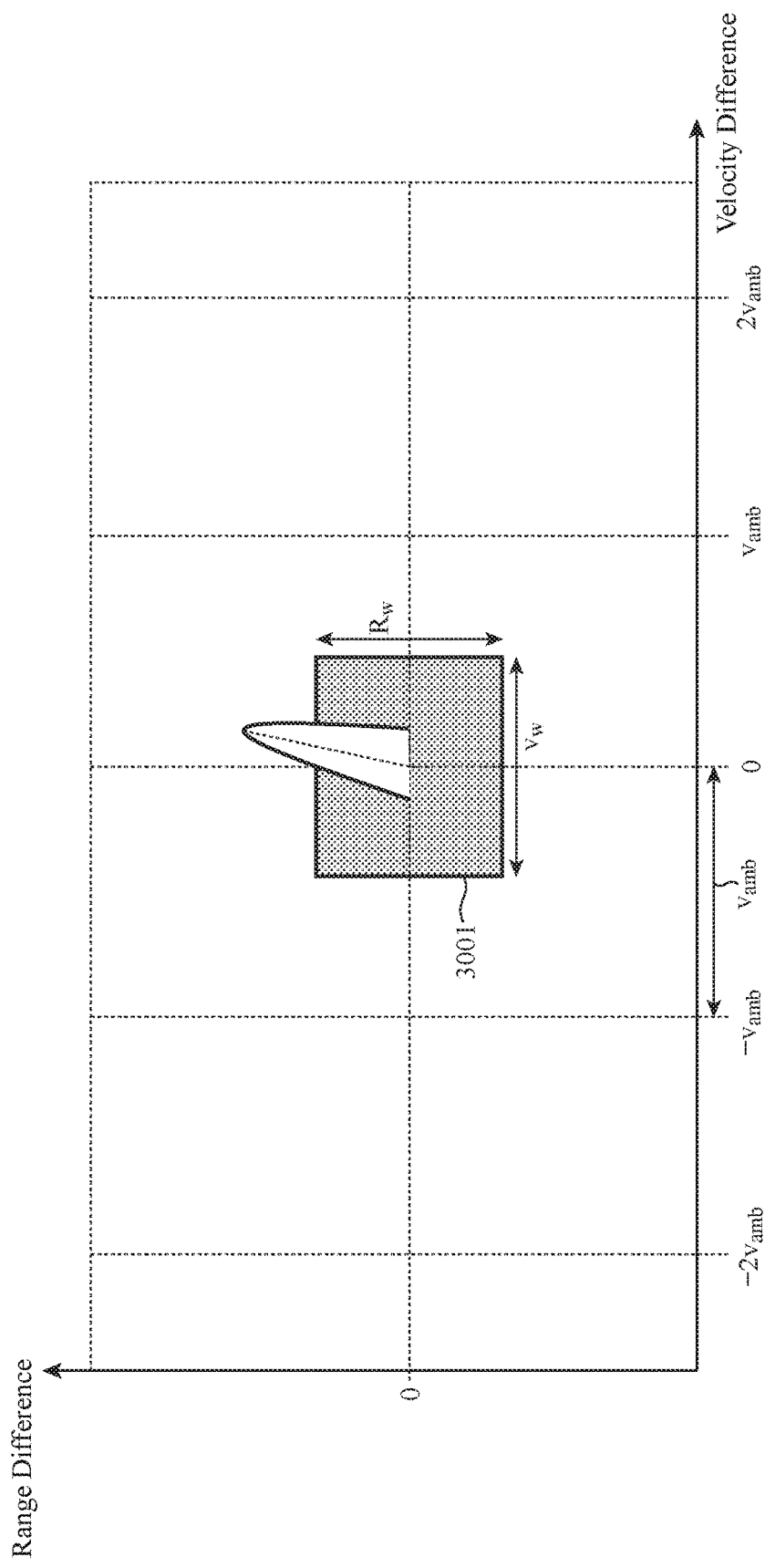
FIG. 30 is an explanatory illustration showing the details of processing for detecting a target candidate according to Embodiment 3 of the present disclosure.

The second target candidate detecting unit 245 performs detection of a target candidate on the signal $R_2(n_t)$ after second correlation, which is acquired from the second correlation unit 244, on the basis of a signal strength. The second target candidate detecting unit 245 detects a target candidate from among target candidates on the basis of a signal strength while setting a target region having a velocity difference of $\pm v_w/2$ and a range difference of $\pm R_w/2$, as shown in FIG. 30, in order to make a distinction whether the target candidate is the true target or a virtual image (refer to the detection region 3001). More specifically, because when a target candidate is the true target, the velocity difference is 0 and the range difference is 0, a region in the vicinity of the velocity difference=0 and the range difference=0 is defined as the detection target region. Here, because a virtual image occurs on the basis of the velocity $v_{amb}$ measurable without ambiguity, the detection target region is determined on the basis of the velocity $v_{amb}$ measurable without ambiguity, and the range $v_w$ of velocity differences and the range $R_w$ of range differences are calculated in accordance with Equation (40).

Because when a target candidate is the target, the velocity difference and the range difference are small, whereas when a target candidate is a virtual image, the velocity difference and the range difference are large, by disposing the detection region from the signal after second correlation, there is provided an advantage that a distinction between the target and a virtual image can be made, false alarms are reduced, and the detection performance is improved. Therefore, in the case of a signal state as shown in FIG. 28, the first target candidate 2801 which is the true target is detected while the second target candidate 2802 which is a virtual image is not detected, and the detection performance is improved.

The second target candidate detecting unit 245 outputs the target candidate arrival angle, the target candidate relative velocity, and the target candidate relative range of the target candidate which is detected to a display 250.

$$\begin{cases} v_w = v_{amb} \\ R_w = f_0 \dfrac{2v_{amb}}{c} \dfrac{T_0}{\Delta B} \end{cases} \quad (40)$$

As explained above, because in the radar system according to Embodiment 3, the second correlation unit 244 performs the second correlation process of determining a correlation between the integrated signal $R_{\Sigma Tx,Rx}(n_\theta, h_{czr}, 1)$ based on a velocity and a range after correlation, and each two-dimensional reference signal $Ex(n_r)$, to generate a signal $R_2(n_r)$ after second correlation with each target candidate, and the second target candidate detecting unit 245 performs detection of a target candidate on the signal $R_2(n_r)$ after second correlation on the basis of a signal strength, the selection of a target candidate from target candidates can be made while a distinction between a target and a virtual image is made, false alarms can be reduced, and the detection performance of the radar system can be improved. Further, the relative range, the relative velocity, and the arrival angle of the target candidate can be calculated without ambiguity, and the performance of calculation of the range, the velocity, and the arrival angle of the radar system can be improved.

Although in the above-mentioned example, the configuration in which the second correlation unit 244 and the second target candidate detecting unit 245 are added to the configuration according to Embodiment 2 is explained, the same advantages can be provided even in a case of applying the second correlation unit 244 and the second target candidate detecting unit 245 to the radar system according to Embodiment 1.

As explained above, because the radar system according to Embodiment 3 includes the second correlation unit for performing a correlation process on band-synthesized signals based on a velocity and a range after correlation by using a two-dimensional reference signal based on a relative velocity, a relative range, and an arrival angle of each target candidate, to generate a signal after second correlation process, and the second target candidate detecting unit for performing detection of a target candidate on output signals from the second correlation unit on the basis of signal strength, the selection of a target candidate from target candidates can be made while a distinction between a target and a virtual image is made, false alarms can be reduced, and the detection performance of the radar system can be improved.

Note that any combination of two or more of the above-mentioned embodiments can be made, various modifications can be made to any component according to any one of the above-mentioned embodiments, and any component in any one of the above-mentioned embodiments can be omitted, within the scope of the invention.

INDUSTRIAL APPLICABILITY

As explained above, the radar system according to the present disclosure has a configuration of being able to improve the performance of detection of a target even in a case in which there is an influence of the Doppler frequency of the target, the radar system is suitable for use in radars such as a MIMO radar.

REFERENCE SIGNS LIST

100-$n_{Tx}$: transmission radar, 110-$n_{Tx}$: aerial, 120-$n_{Tx}$ and 120a-$n_{Tx}$: transmitting unit, 121-$n_{Tx}$: transmitter, 122-$n_{Tx}$: pulse modulator, 123-$n_{Tx}$: local oscillator, 124-$n_{Tx}$ and 124a-$n_{Tx}$: intrapulse modulation signal generator, 200-$n_{Rx}$ and 200a-$n_{Rx}$: reception radar, 210-$n_{Rx}$: aerial, 220-$n_{Rx}$: receiving unit, 221-$n_{Rx}$: receiver, 222-$n_{Rx}$: A/D converter, 230-$n_{Rx}$ and 230a-$n_{Rx}$: first signal processor, 231-$n_{Rx}$: frequency domain transforming unit, 232-$n_{Rx}$ and 232a-$n_{Rx}$: correlation unit, 233-$n_{Rx}$: integrating unit, 240, 240a, and 240b: second signal processor, 241: target candidate detecting unit, 242: target's relative-velocity/relative-range/arrival-angle calculating unit, 243: second integrating unit, 244: second correlation unit, 245: second target candidate detecting unit, and 250: display.

The invention claimed is:

1. A radar system comprising:
multiple transmission radars for emitting transmission signals with different frequencies, each frequency being generated using a pulse signal and an intrapulse modulation signal used for performing frequency modulation on the pulse signal;
a receiver for converting received signals of the transmission signals that return from a target on reflection, into a reception video signal;
a processor to execute a program;
a memory to store the program which, when executed by the processor, causes the processor to perform the processes of:
transforming the reception video signal into signals based on a velocity and a range in such a way that Doppler frequencies of the target belongs to a same velocity bin number regardless of a change in the frequencies of the transmission signals to provide first plural output signals;
performing correlation process on the first plural output signals by using reference signals associated with both a transmission frequency of the multiple transmission radars and a velocity corresponding to a velocity bin number, to generate signals based on a velocity and a range after correlation to provide second plural output signals, the second plural output signals being separate for each of the transmission frequencies of the multiple transmission radars;

integrating the second plural output signals using target arrival angle candidates, to generate band-synthesized signals based on a velocity and a range after correlation to provide third plural output signals;

performing detection of a target candidate on the third plural output signals on a basis of signal strength; and calculating a relative velocity, a relative range, and an arrival angle of the target candidate.

2. The radar system according to claim 1, wherein the processor further perform the processes of:

integrating the band-synthesized signals based on a velocity and a range after correlation using target arrival angle candidates, to generate integrated signals based on a velocity and a range after correlation to provide fourth plural output signals, and performing detection of a target candidate on the fourth plural output signals.

3. The radar system according to claim 1, wherein the multiple transmission radars emit transmission signals with different frequencies for which intrapulse frequency modulation is performed upwardly or downwardly, keeping a preset frequency spacing.

4. The radar system according to claim 1, wherein the multiple transmission radars emit the transmission signals with the different frequencies for which intrapulse frequency modulation is performed upwardly or downwardly in such a manner that frequency modulations in adjacent frequency bands are complex conjugates, keeping a preset frequency spacing.

5. The radar system according to claim 1, wherein the multiple transmission radars emit the transmitted signals with the different frequencies for which intrapulse frequency modulation is performed upwardly or downwardly in such a manner that frequency modulations in symmetric frequency bands are complex conjugates, keeping a preset frequency spacing.

6. The radar system according to claim 1, wherein the processor performs the transforming process by additionally performing a window function process on the reception video signal.

7. The radar system according to claim 1, wherein the processor uses a discrete Fourier transform to sample reception video signals obtained after frequency domain transform at intervals that are determined based on a center transmission frequency.

8. The radar system according to claim 1, wherein the processor uses a chirp z-transform to sample reception video signals obtained after frequency domain transform at intervals that are determined based on a center transmission frequency.

9. The radar system according to claim 1, wherein the processor uses the reference signals to each of which a phase based on a target displacement distance during an observation time is added.

10. The radar system according to claim 1, wherein the processor further perform the processes of:

performing a correlation process on the band-synthesized signals based on a velocity and a range after correlation by using a two-dimensional reference signal based on a relative velocity, a relative range, and an arrival angle of each target candidate, to generate a signal after second correlation process to provide fifth plural output signals, and performing detection of a target candidate on the fifth plural output signals on a basis of signal strength.

* * * * *